United States Patent [19]
Zuk

[11] Patent Number: 5,062,041
[45] Date of Patent: Oct. 29, 1991

[54] PROCESSOR/COPROCESSOR INTERFACE APPARATUS INCLUDING MICROINSTRUCTION CLOCK SYNCHRONIZATION

[75] Inventor: William S. Zuk, Carlisle, Mass.

[73] Assignee: Wang Laboratories, Inc., Lowell, Mass.

[21] Appl. No.: 291,847

[22] Filed: Dec. 29, 1988

[51] Int. Cl.⁵ .................. G06F 1/04; G06F 1/12; G06F 9/00

[52] U.S. Cl. .................. 364/200; 364/228; 364/228.6; 364/240.3; 364/262.4; 364/262.7; 364/262.8; 364/270; 364/270.3; 364/270.5; 364/271; 364/271.6

[58] Field of Search ... 364/200 MS File, 900 MS File

[56] References Cited

U.S. PATENT DOCUMENTS

| | | |
|---|---|---|
| 3,871,578 | 3/1975 | Van De Goor et al. |
| 4,161,784 | 7/1979 | Cushing |
| 4,241,418 | 12/1980 | Stanley ............... 364/900 |
| 4,386,401 | 5/1983 | O'Brien ............... 364/200 |
| 4,419,739 | 12/1983 | Blum ............... 364/900 |
| 4,589,067 | 5/1986 | Porter et al. |
| 4,612,628 | 9/1986 | Beauchamp et al. |
| 4,613,936 | 9/1986 | Andresen ............... 364/200 |
| 4,648,034 | 3/1987 | Heninger ............... 364/200 |
| 4,654,785 | 3/1987 | Nishiyama et al. |
| 4,663,730 | 5/1987 | Ikeda ............... 364/900 |
| 4,718,003 | 1/1988 | Andersen et al. ............... 364/200 |
| 4,729,093 | 3/1988 | Mothersole et al. ............... 364/200 |
| 4,763,294 | 8/1988 | Fong . |

*Primary Examiner*—Stuart N. Hecker
*Assistant Examiner*—George C. Pappas
*Attorney, Agent, or Firm*—Michael H. Shanahan

[57] ABSTRACT

An information processing system includes a first data processing device 10 and a second data processing device 12 each of which is capable if independent instruction execution during instruction cycles having a period which is a multiple of a periodic unit clock signal period. The devices are disclosed to be an arithmetic unit and a central processor which are coupled together by an interface 14. Each of the data processing devices include a clock generation device 180 having an input coupled to the unit clock signal for generating an associated instruction cycle clock signal which has a period which is a multiple of the unit clock signal period. The clock generation device is further operable for suspending the generation of the instruction cycle clock signal and for beginning a next instruction cycle clock signal in synchronism with a transition of the unit clock signal. The devices 10 and 12 each request synchronization of their respective clocks which are then automatically synchronized to the other devices clock during a transition of the unit clock, allowing for instructions and operands to be synchronously passed between the central processor to the arithmetic unit.

48 Claims, 22 Drawing Sheets

| 00 | 01 | 02 | 03 | 04 | 05 | 06 07 | 08 | 09 12 | 13 14 |
|---|---|---|---|---|---|---|---|---|---|
| TIMING 2 | ADMUX 1 | BBUS 1 | ABUS 1 | DISHB 1 | BPORT 2 | APORT 1 | ALU 4 | CIN 2 | |

| 15 | 16 17 | 18 | 19 20 21 | 22 23 | 25 26 | 27 28 | 29 | 30 |
|---|---|---|---|---|---|---|---|---|
| ALUMUX 2 | LRI 1 | LARA 1 | LARB 2 | AOUT 2 | ACMD 3 | SBMUX 2 | SAMUX 2 | SRMUX 1 |

| 31 | 32 33 | 34 35 | 36 | 37 | 40 41 | 44 |
|---|---|---|---|---|---|---|
| LSRA 2 | LSRB 2 | LSRC 1 | SOUT 1 | SCMDO 4 | SCMDI 4 | |

| 45 46 | 47 | 50 51 | 58 |
|---|---|---|---|
| AUMEM 2 | MCMD 4 | SPRAM 8 | |

| 59 60 | 61 | 62 63 | 64 65 | 66 67 | 68 | 69 | 70 | 74 |
|---|---|---|---|---|---|---|---|---|
| SCOUNT 2 | EDMUX 1 | EBP 2 | EAP 1 | EALU 2 | LERI 1 | LERA 1 | LERB 1 | ECMD 5 |

| 75 | 78 79 | 83 84 | 92 | 93 | 94 | 95 |
|---|---|---|---|---|---|---|
| MAC 4 | TEST 5 | BRANCH 9 | | SPARE 1 | BREAK 1 | PARITY 1 |

UNCONDITIONAL BRANCH 12

81 83 | AIS 1 | FPRA_IN 4 | SHIFT 4

84 85 88 | AISMODE 1 | NWAY 3

L1 = 4
L2 = 3
B1+D1 = XXXXXXX2
B2+D2 = XXXXXXX1

OPERAND 1, L1=4, B1+D1 = XX···X2

OPERAND 2, L2=3, B2+D2 = XX···X1

SRB 76 (DATA FROM CACHE)

ARA 44 (RIGHT ALIGNED DATA)

SRA 78 (DATA FROM CACHE)

DATA TO ALU (RIGHT ALIGNED DATA)

ARB 38 (ALU RESULT DATA)

ARB 38 (ALU RESULT DATA)

SRC 84 (LEFT ALIGNED DATA, SIGN MERGED)

AD FOLLOWED BY BC (VA<29>=0)

EXAMPLE:
```
  0000 0098 7654 3210
+ 0000 0030 6196 4320
  ─────────────────────
  0000 0129 3850 7530
```

OPERAND 2:            OPERAND 1:
```
0000 0030 6196 4320   0000 0098 7654 3210    ALL VALID BCD
                      6666 6666 6666 6666    +6 BIAS
                      ─────────────────────
                      6666 66FE DCBA 9876
```

```
  0000 0030 6196 4320
+ 6666 66FE DCBA 9876
  ─────────────────────
  6666 672F 3E50 DB96   BINARY SUM 0000 0010 1011 0000   HEX DIGIT CARRY OUT
```

```
  6666 672F 3E50 DB96   BINARY SUM
- 6666 6606 0600 6666   REVERSE BIAS IF NO
  ─────────────────────  DIGIT CARRY
  0000 0129 3850 7530   CORRECT DECIMAL SUM
```

FIG. 8a DECIMAL ADDITION

EXAMPLE:
```
  0000 0098 7654 3210
- 0000 0065 8419 2730
  ───────────────────
  0000 0032 9235 0480
```

OPERAND 2:                OPERAND 1:
0000 0065 8419 2730       0000 0098 7654 3210    ALL VALID BCD

```
  0000 0098 7654 3210
- 0000 0065 8419 2730
  ───────────────────
  0000 0032 F23B 0AE0     BINARY SUBTRACT
  1111 1111 0110 1001     HEX DIGIT BORROW
  0000 0032 F23B 0AE0     BINARY DIFFERENCE
- 0000 0000 6006 0660     REVERSE BIAS IF NO BORROW
  ───────────────────
  0000 0032 9235 0480     CORRECT DECIMAL DIFFERENCE
```

FIG. 8b DECIMAL SUBTRACTION

EXAMPLE:
```
    0000 0065 8419 2730
  - 0000 0098 7654 3210
  ─────────────────────
  -(0000 0032 9235 0480)
```

OPERAND 2:                    OPERAND 1:
0000 0098 7654 3210           0000 0065 8419 2730    ALL VALID BCD

```
    0000 0065 8419 2730
  - 0000 0098 7654 3210
  ─────────────────────
    FFFF FFCD 0DC4 F520    BINARY SUBTRACT WITH
                           NEGATIVE INTERMEDIATE
                           RESULT 0000 0000 1001 0111    HEX DIGIT BORROW

FFFF FFCD 0DC4 F520    BINARY DIFFERENCE
  - 6666 6666 0660 6000    REVERSE BIAS IF NO BORROW
  ─────────────────────
    9999 9967 0764 9520    DECIMAL DIFFERENCE
                           RECORD NEGATIVE SIGN
```

FOR SIGN-MAGNITUDE REPRESENTATION, PERFORM (O - RESULT):

```
    0000 0000 0000 0000
  - 9999 9967 0764 9520    INTERMEDIATE RESULT
  ─────────────────────
    6666 6698 F89B 6AE0    BINARY SUBTRACT 0000 0000 0000 0001    HEX DIGIT BORROW 6666 6698 F89B 6AE0    BINARY DIFFERENCE
  - 6666 6666 6666 6660    REVERSE BIAS IF NO BORROW
  ─────────────────────
  -(0000 0032 9235 0480)   CORRECT DECIMAL DIFFERENCE,
                           SIGN-MAGNITUDE REPRESENTATION
```

*FIG. 8c* DECIMAL SUBTRACTION W/ NEGATIVE RESULT 5,062,041

PROCESSOR/COPROCESSOR INTERFACE APPARATUS INCLUDING MICROINSTRUCTION CLOCK SYNCHRONIZATION

FIELD OF THE INVENTION

This invention relates generally to data processing apparatus and, in particular, to the synchronization of data processing operations between two processing entities which, in an illustrative embodiment disclosed below, include a central processing unit having a high speed cache memory and an arithmetic execution unit which is coupled to the central processing unit by a unique interface.

BACKGROUND OF THE INVENTION

A important consideration in a high performance data processing system is the speed of execution of instructions, such as arithmetic operations, which are distributed between processing entities or units. In order to provide for a significant performance improvement when calculating certain types of mathematical operations, such as single or double precision floating point operations, it is known to provide a special purpose arithmetic unit (AU) which is coupled to a central processing unit (CPU), the arithmetic unit executing arithmetic operations under control of the CPU. For some applications, such as COBOL environments, fast binary coded decimal (BCD) calculations and string-related operations are important requirements. However, many conventional AU devices have limited capability for handling string operands and BCD numbers. Furthermore, for many conventional AU devices the coupling strength or tightness between the AU and the CPU is less than optimal, resulting in significant latency and "dead" cycles when synchronizing the operation of the AU to that of the CPU.

The overall processing efficiency in such a CPU/AU system is related to a number of factors. The signal coupling and timing between the CPU and the AU are two such factors. For example, it is desirable for some types of calculations that the CPU and AU operate asynchronously to one another while the AU is performing a calculation and that the CPU and AU be rapidly resynchronized to one another when a result is generated by the AU. Such asynchronous operation provides for a processing concurrency which increases overall CPU throughput. Furthermore, rapid resynchronization is important in that a next instruction in the CPU may require the result of the instruction being executed in the AU, such as expressed by condition codes, so that a next CPU instruction may test the condition codes to determine a branch path.

Another important factor is the nature of the coupling between the AU and a memory unit wherein operands and results are stored. For example, it is important that the AU fetch operands from a memory and store results back into the memory in a manner which consumes a minimum amount of memory bus bandwidth. Also, it is important that the AU fetch and store data which may not be aligned on an even memory word boundary or fetch and store data which crosses a memory word boundary or boundaries. This latter requirement is made even more demanding if the CPU is responsible for addressing and operating the memory simultaneously with an AU read of operands or an AU storage of result data. Such a shared memory access capability increases the CP/AU interface complexity.

SUMMARY OF THE INVENTION

In accordance with the method and apparatus of the invention there is disclosed an information processing system which includes a first data processing device and a second data processing device each of which is operable for executing instructions either in conjunction with one another or independently of one another during microinstruction cycles having a period which is a multiple of a periodic unit clock signal period. Each of the data processing devices include a clock generation device having an input coupled to the unit clock signal for generating an associated microinstruction cycle clock signal which has a period which is a multiple of the unit clock signal period. The clock generation device is further operable for suspending the generation of the microinstruction cycle clock signal and for beginning a next microinstruction cycle clock signal in synchronism with a transition of the unit clock signal.

Further in accordance with the invention there is disclosed an information processing system which includes a memory, a first data processing unit operable for addressing the memory, wherein instructions and operands related to instructions are stored, and a second data processing unit which is operable for executing predetermined ones of the stored instructions. The second data processing unit is coupled to the memory for reading operands therefrom and for storing therein a result of an instruction which operates on the operands. The system further includes an electrical interface coupled between the first and the second data processing units, the electrical interface including a plurality of signals coupled to both the first and the second data processing units. The plurality of signals include a repetitive unit clock signal which has a substantially constant period associated therewith; the unit clock signal being received by both the first and the second data processing units. The plurality of signals also include an instruction signal generated by the first data processing unit and received by the second data processing unit; the instruction signal being expressive of at least an instruction to be executed by the second data processing unit. The plurality of signals further includes a first end of synchronized cycle signal asserted by the first data processing unit and received by the second data processing unit, the first end of synchronized cycle signal indicating, when asserted, that the first data processing unit has completed the execution of a microinstruction and is ready to synchronize with the second data processing unit. A second end of synchronized cycle signal is also provided, the second end of synchronized cycle signal being asserted by the second data processing unit and received by the first data processing unit; the second end of cycle signal indicating, when asserted, that the second data processing means has completed the execution of a microinstruction and is ready to synchronize with the first data processing unit. In addition, each of the first and the second data processing units is operable for generating a microinstruction clock signal having a period which is a function of a multiple of the period of the unit clock signal and is further operable for generating a request for synchronizing the beginning of the microinstruction clock signal of each of the data processing means to the unit clock signal. Also, each of the first and the second data processing units is responsive to the assertion of the first and the second end of cycle signals and also to the generation of a synchronization request for simultaneously synchronizing the beginning of the associated microinstruction clock signal with the unit clock signal.

BRIEF DESCRIPTION OF THE DRAWING

The foregoing and other aspects of the invention will be made more apparent in the ensuing Detailed Description of the Invention when read in conjunction with the attached Drawing, wherein:

FIG. 3 shows the format and data fields of a microinstruction which is employed by the AU of the invention;

FIGS. 8a, 8b and 8c illustrate the biasing of decimal addition and subtraction by sixes and serves as an aid in understanding the operation of the binary twos-complement ALU during a single cycle BCD operation.

DETAILED DESCRIPTION OF THE INVENTION

Figure 1A:
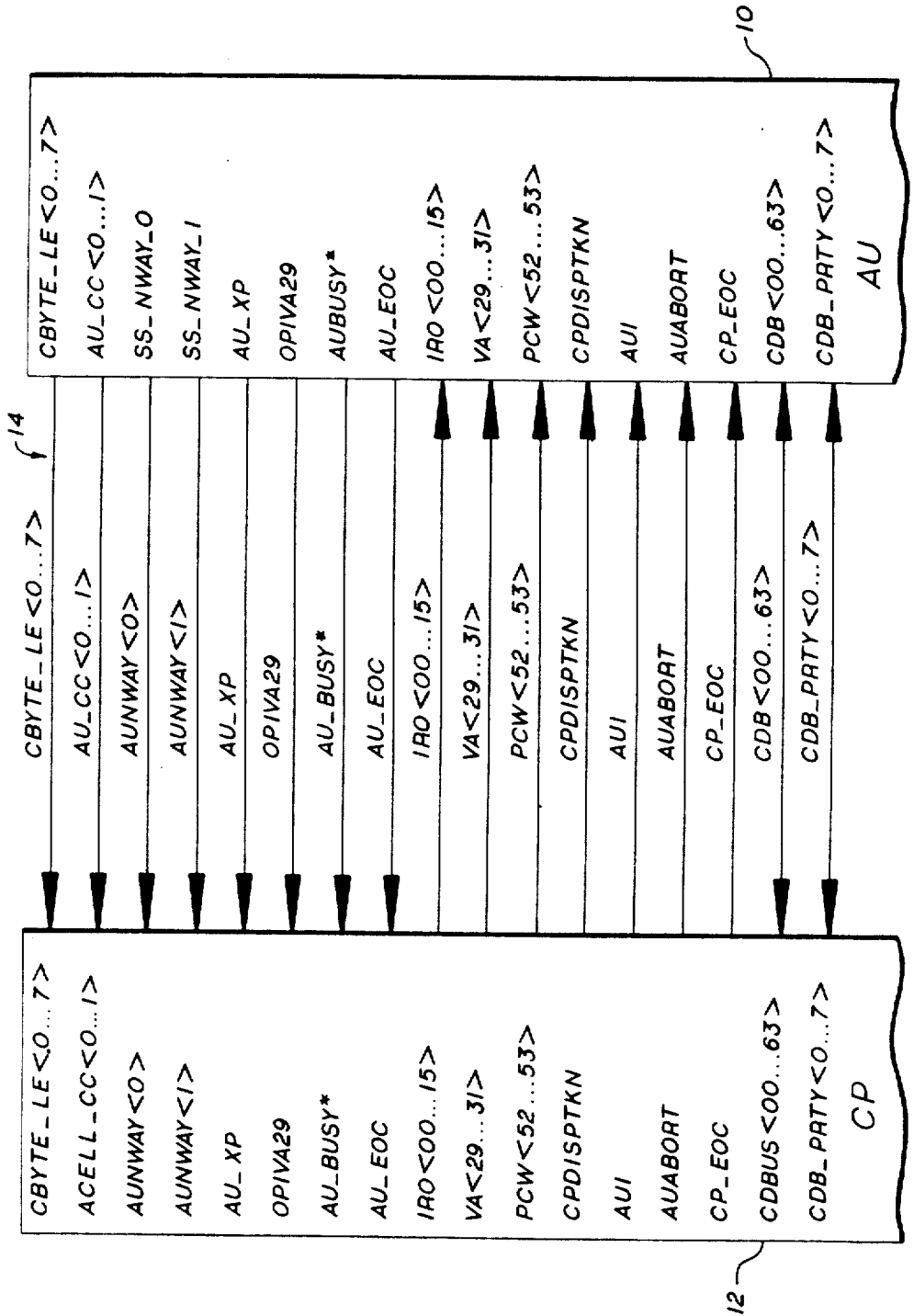
FIGS. 1a and 1b are a simplified block diagram which illustrate interface signals which are coupled between the CP and the AU.
Figure 1B:
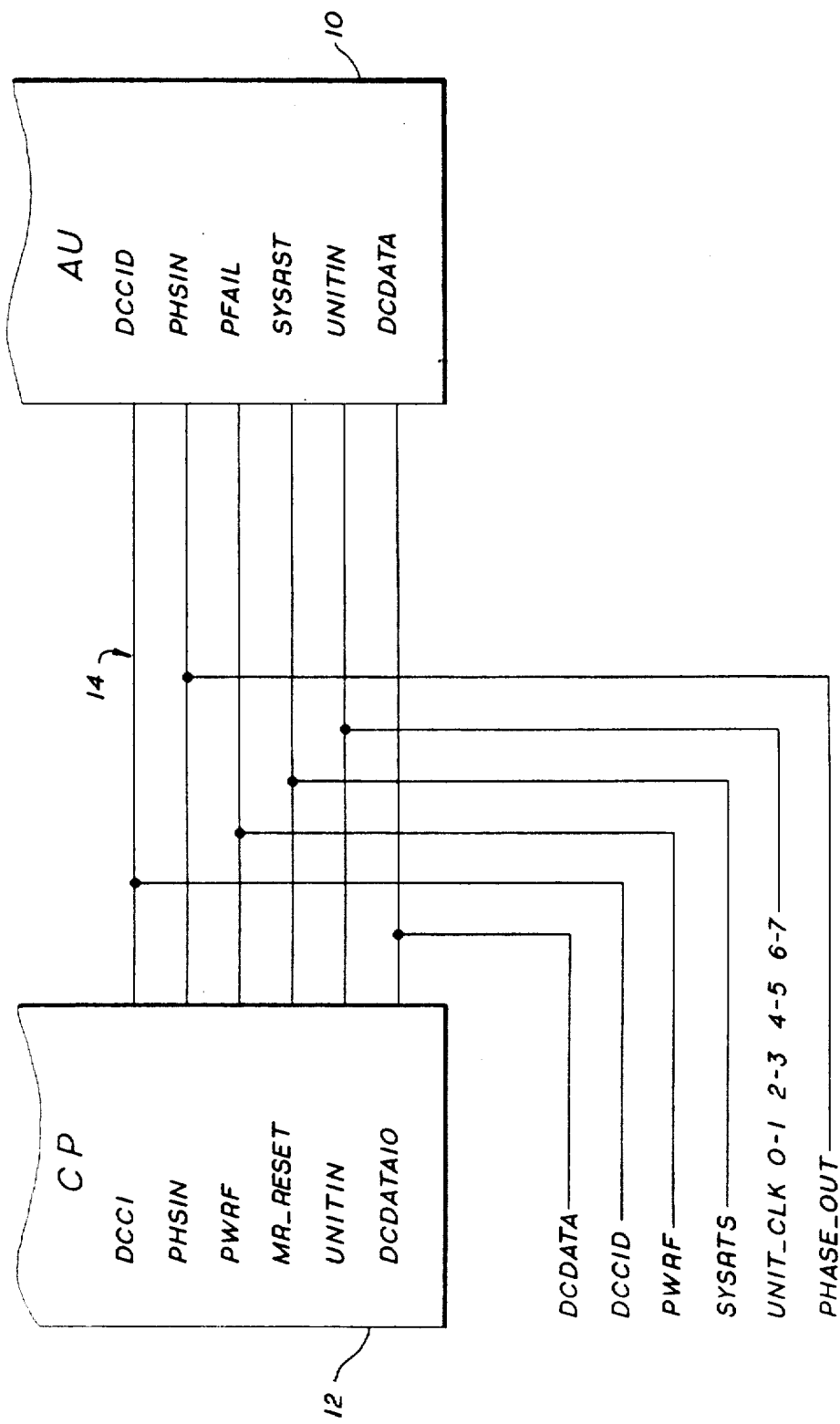

Referring now to FIGS. 1a and 1b there is illustrated an arithmetic unit (AU) 10 coupled to a central processor (CP) 12. Although the invention will be disclosed in much a technological context it should be realized that the teaching of the invention is applicable to coprocessor and multiprocessor information processing systems in general, especially to those types of systems which require both asynchronous and synchronous processor operation and also the ability to rapidly resynchronize two processors after some period of asynchronous operation.

The CP 12 comprises 16 general purpose registers and the AU 10 comprises four 64 bit floating point registers. The AU 10 is operable for executing arithmetic operations including, floating point (FP), storage-to-storage (SS) and conversion instructions. FP instructions include addition, subtraction, multiplication, division and comparison. These operations are accomplished in single or double precision hexadecimal (base 16 mantissa) or in double precision decimal (base 10 mantissa) formats. A number of math assists are also executed such as sine, cosine and log functions. SS instructions include addition, subtraction, multiplication, division and comparison of packed decimal integers (strings). SS instructions also include format-type instructions such as pack, unpack, pack and align, and unpack and align in addition to other string instructions such as move and compare characters. The conversion instructions include binary integer to FP (and vice versa), binary integer to packed decimal (and vice versa) and FP decimal to packed decimal (and vice versa). As will be described, the AU 10 operates either synchronously or asynchronously with the CP 12.

The AU 10 and CP 12 form a part of a data or information processing system which includes a system bus and a plurality of different types of bus connections which are coupled to the system bus. In a current embodiment of the invention a data processing system has either one or two CPs, each one having an associated AU, although larger numbers of CP/AU pairs are possible. The CP 12 includes a high speed cache memory from which AU 10 extracts operands and into which AU 10 stores the results of certain of the arithmetic operations performed on the operands. Both the CP and AU have associated microinstruction stores which define macroinstructions. A macroinstruction may include one or more microinstructions. Dispatching is a process which involves either the AU or the CP moving from one macroinstruction to another.

AU 10 and CP 12 are electrically coupled together by a plurality of electrical signals which are illustrated in FIGS. 1a and 1b. In a preferred embodiment of the invention the AU 10 and the CP 12 are each embodied on a separate printed circuit board which includes gate array and discrete logical devices. Both AU 10 and CP 12 are electrically and physically coupled to a backplane and communicate via a CP/AU bus 14, the CP/AU bus 14 including at least the signals illustrated in FIGS. 1a and 1b. Of course, the teaching of the invention may be embodied by a number of different circuits and circuit layout topologies and, as such, it should be understood that the invention is not to be construed to be limited to the presently preferred embodiment which is described herein.

Figure 2:
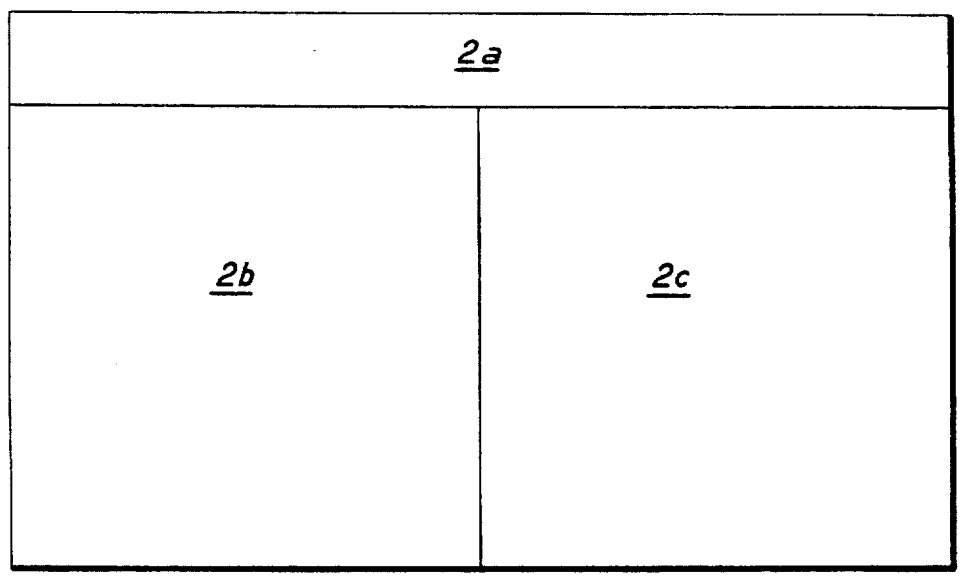
FIG. 2 the orientation of FIGS. 2a, 2b and 2c.
Figure 2A:
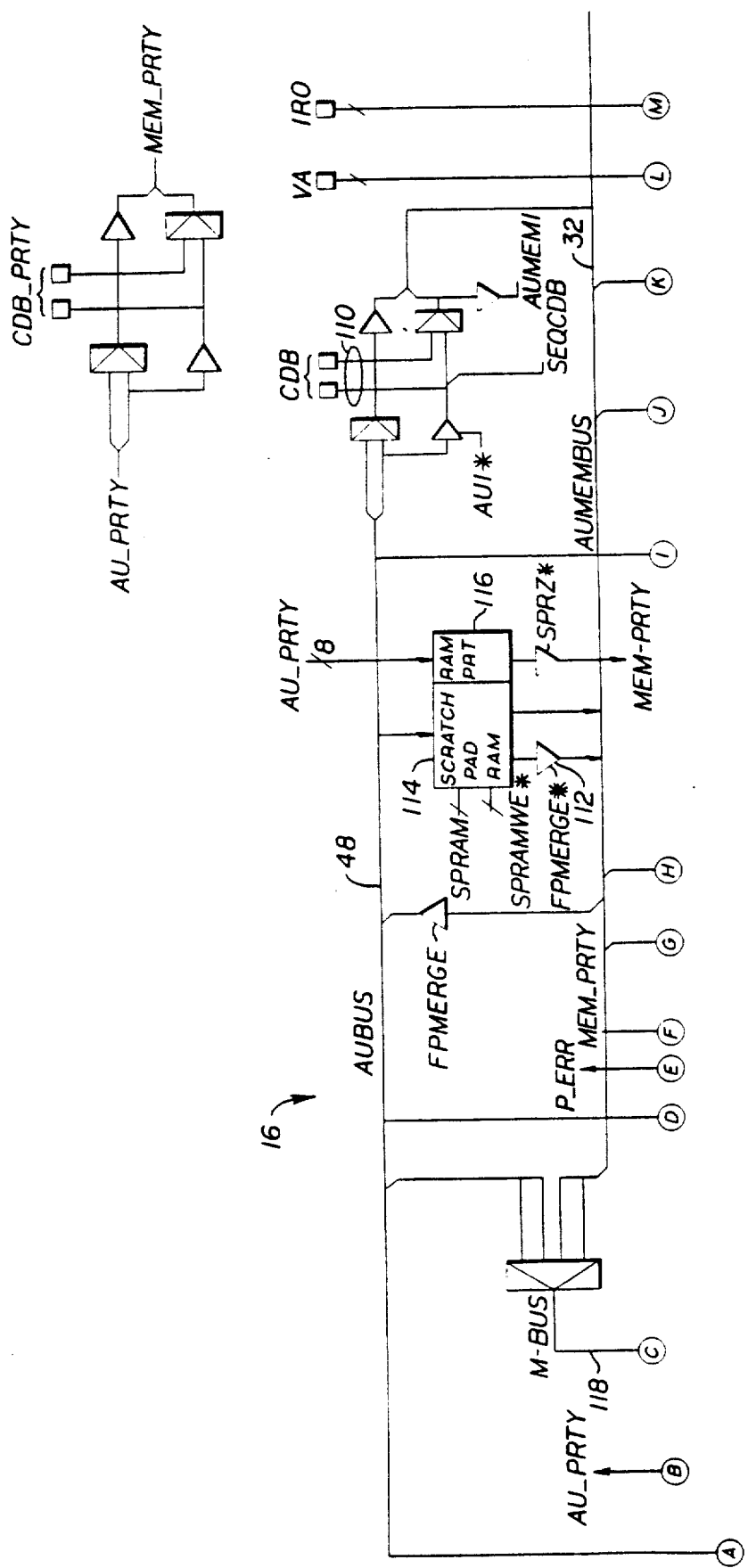
FIGS. 2a, 2b and 2c are each a portion of a block diagram which illustrates the AU of the invention.
Figure 2B:
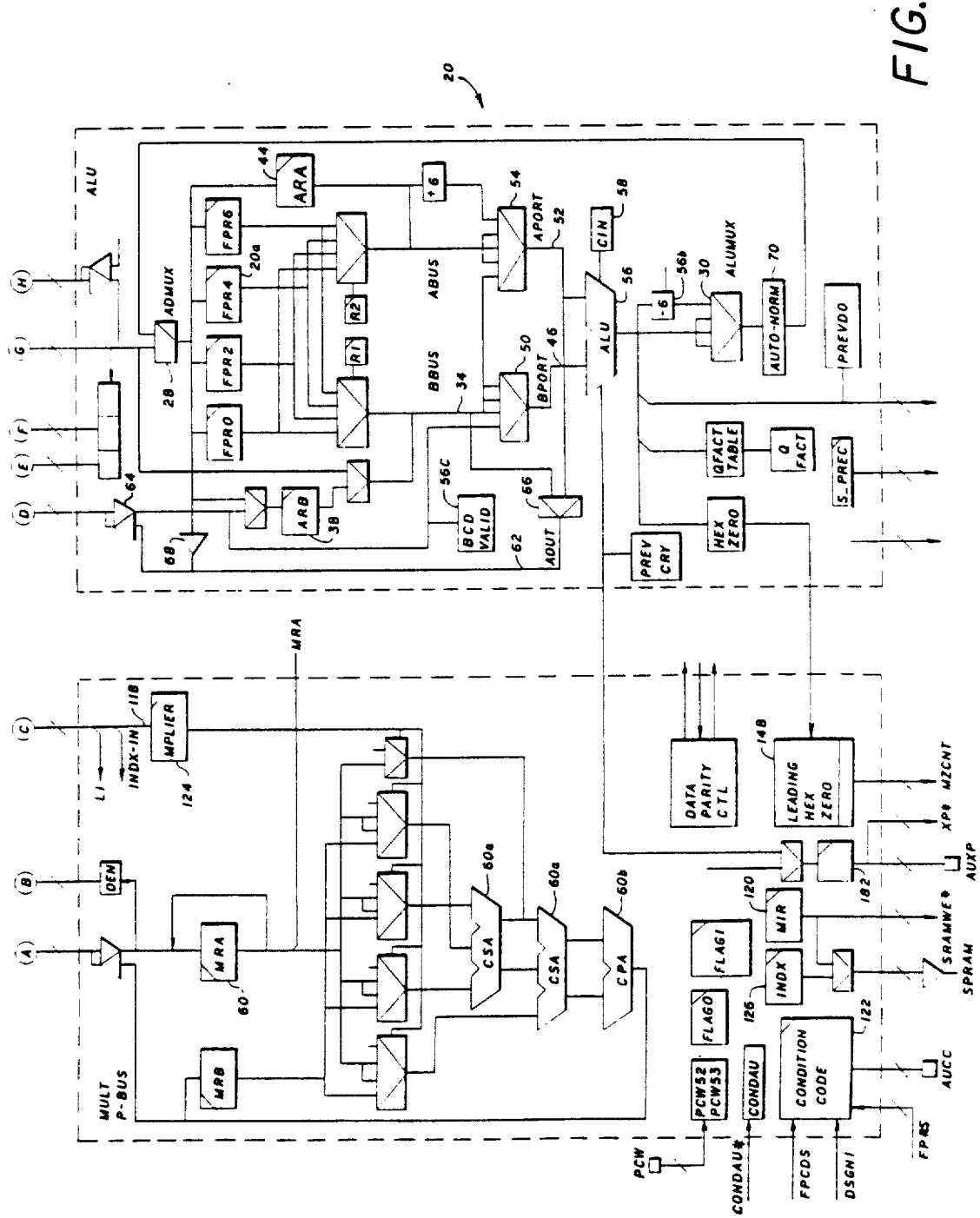
Figure 2C:
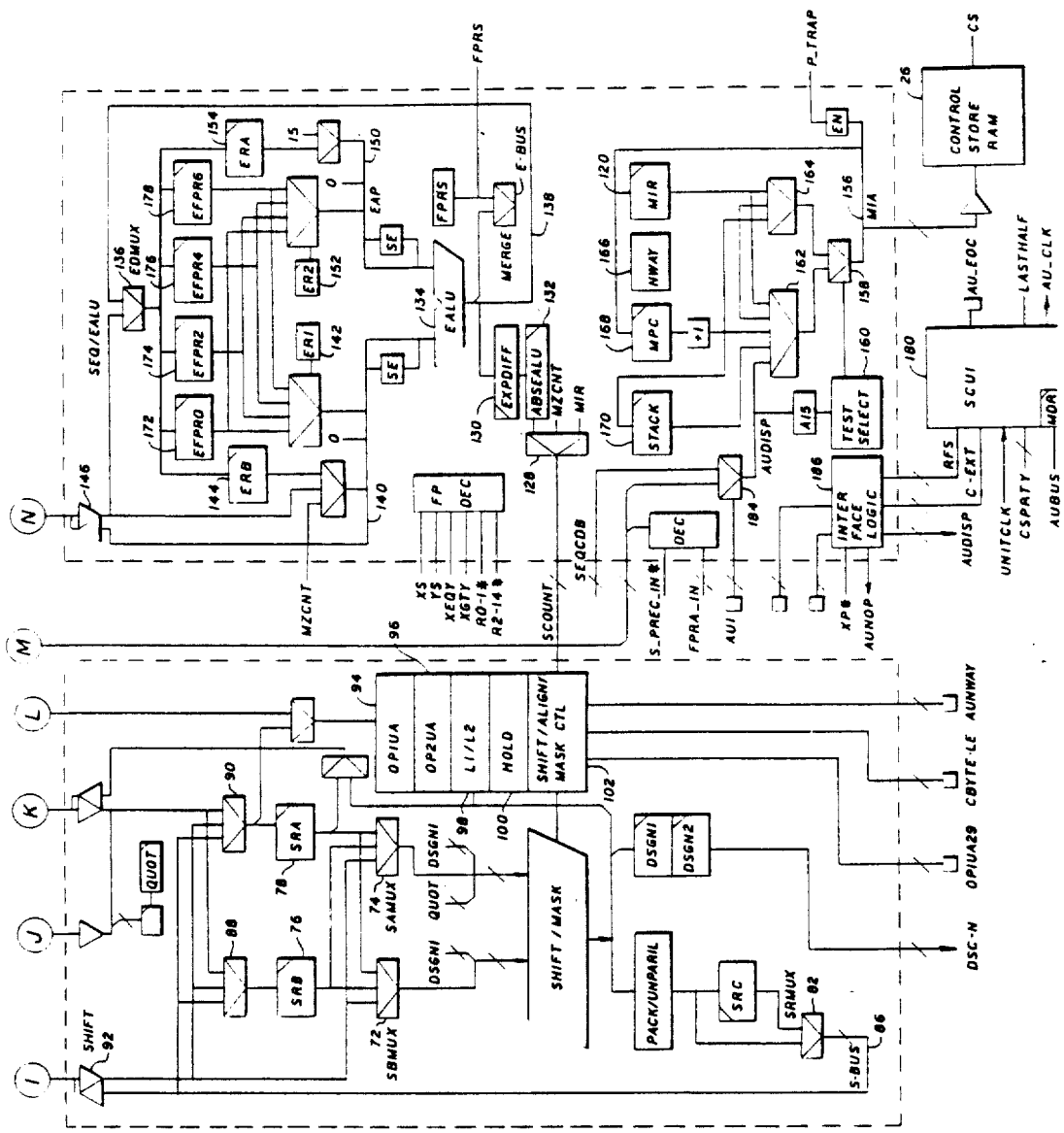
Figure 2D:
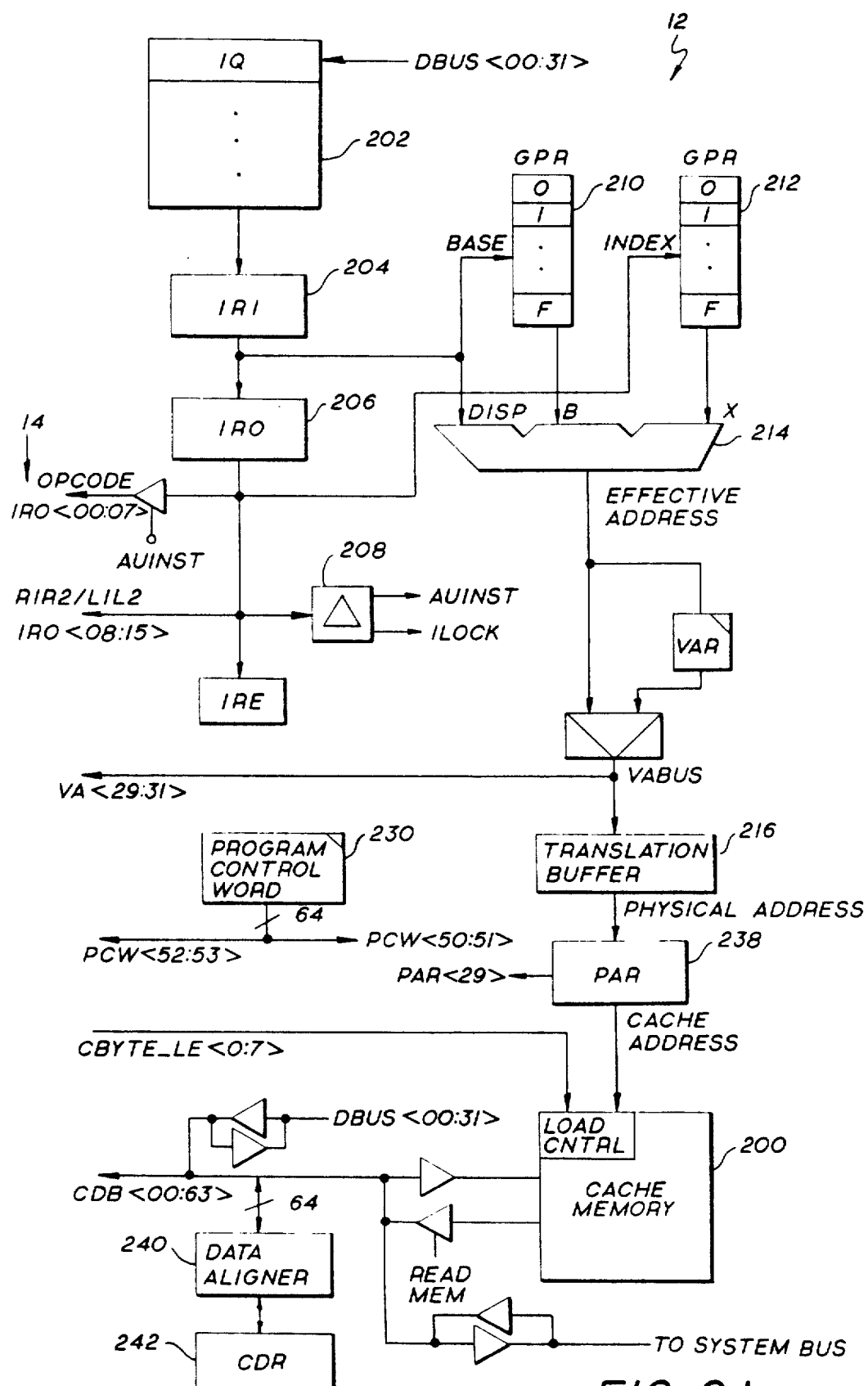
FIGS. 2d and 2e are each a simplified block diagram of a portion of the CP particularly showing the CP-AU interface signals.
Figure 2E:
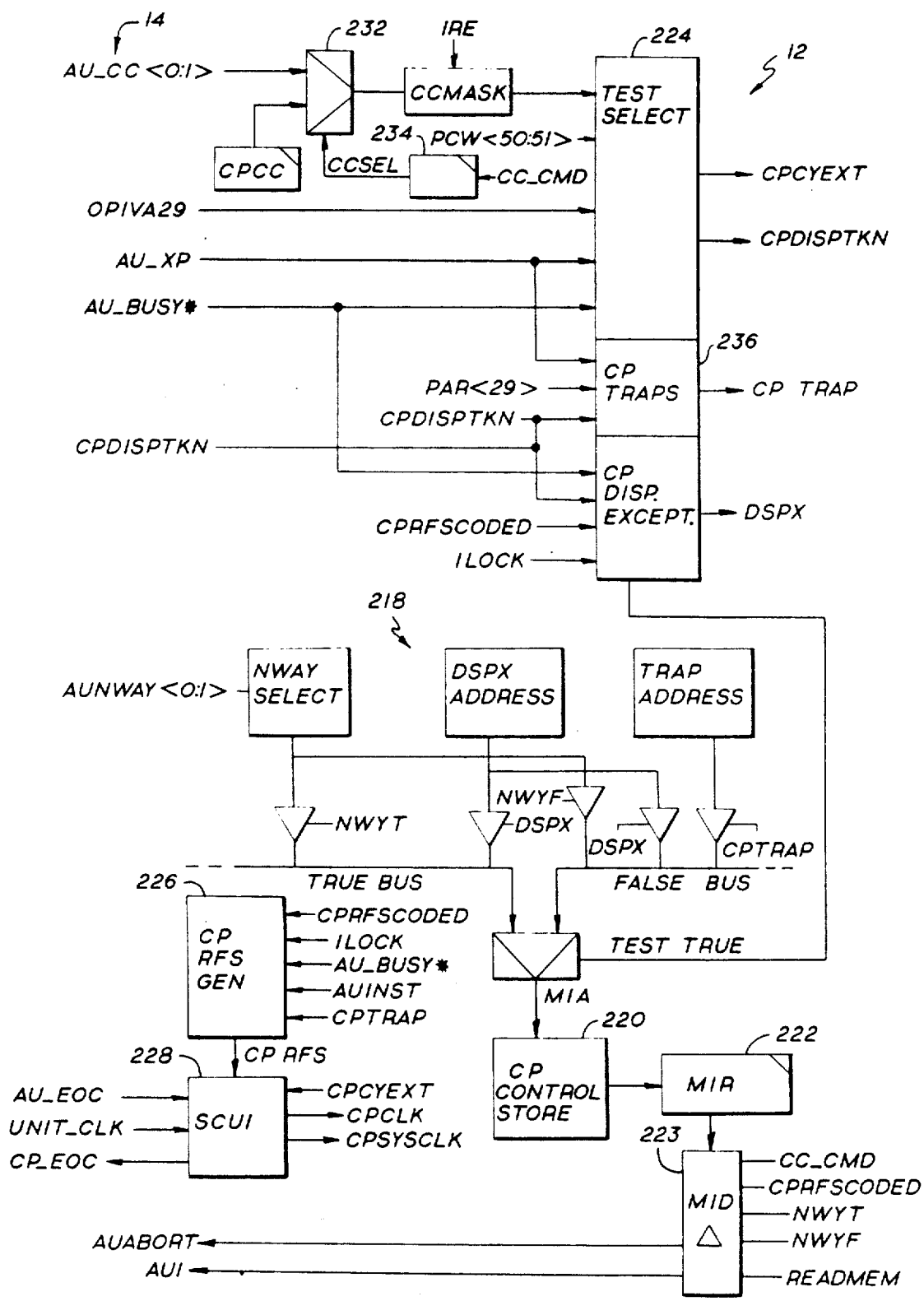

Referring to FIGS. 2d and 2e it can be seen that the CP 12 includes the cache memory 200 having an output data bus (DBUS) which is coupled to an Instruction Queue (IQ) 202. IQ 202 includes an Instruction Register 1 (IR1) 204 and an Instruction Register 0 (IR0) 206. IR1 204 and IR0 206 are each 16 bits, or one halfword, in width while the cache 200 is 64 bits in width, or one double word. The cache data bus (CDB<00:63>) is also provided to the AU 10 while eight cache byte load enable signals (CBYTE_LE<0:7>) are input from the AU 10 for selectively writing result data back into the cache 200. Decoder 208 determines if the instruction held by IR0 206 is an AU executed instruction (AUINST) or an interlock (ILOCK) type of instruction. AU executed instructions are provided to AU 10 on interface signal lines IRO<00:07> while, depending on the type of instruction, either Floating Point Register numbers (R1R2) or operand lengths (L1L2) are provided on signal lines IRO<08:15>. Pipelined address generation is provided by General Purpose Registers (GPR) 216 and 212 in conjunction with ALU 214. Virtual to physical address translation is provided by a Translation Buffer 216. The least significant three bits of the virtual address (VA<29:31>) are provided to AU 10 so that AU 10 can determine the alignment of the operand data in cache 200.

The CP 12 also includes Microinstruction Address (MIA) generation logic 218 for addressing the CP microinstruction control store 220, the output of control store 220 being registered by Microinstruction Register (MIR) 222 and decoded by a Microinstruction Decoder (MID) 23. The output of MID 223 initiates a number of CP 12 control functions, such as N-Way branches on true and false conditions (NWYT,NWYF) and memory read operations as well as AU 12 interactions, such as AUABORT, CP Request for Synchronization (CPRFSCODED) and AU Instruction (AUI) as will be described in detail hereinafter. Inputs to MIA block 218 include an output from Test Select logic 224 which has as inputs a number of AU 10 generated signals, including AU 10 condition codes (AU_CC<0:1>), operand 1 virtual address bit 29 (OP1VA29), AU Exception Pending (AU_XP) and AU_BUSY*. In addition, the generation of a next microinstruction address for cache 200 read and write operations is affected by the AU 10 generated multiway (NWAY) branch bits (AUNWAY<0:1>).

The AU 10 generated condition codes and the CP 12 generated condition codes are input to a multiplexer 232 which is controlled by a signal, CC Select (CCSEL), which is sourced from a CC Select register 234. CC Select register 234 is controlled by a CC_CMD output of MID 223 and permits a user to select condition codes for examination. In accordance with one aspect of the invention this allows parallel operation of different instructions by the CP and AU and maintains correct condition codes from the user's point of view, regardless of what order instructions are programmed.

CP 12 trap conditions are generated by a CP TRAPS logic block 236 having as inputs the AU 10 Exception Pending (AU_XP) signal and the bit 29 output of Physical Address Register (PAR) 238. PAR<29> is indicative of the alignment of operands within a double word in the cache 200 and is employed, as will be described, to determine the number of reads to entirely fetch a word aligned double word from the cache 200. In this regard the CP 12 also includes a Data Alignment logic block 240 and an associated Cache Data Register (CDR) 242 which can be used to double word align non-double word aligned operand data for the AU 10. In accordance with one aspect of the invention the CP 12 includes CP Request for Synchronization (RFS) logic 226 which determines from a plurality of inputs when it is necessary for the CP 12 to synchronize its operation with the AU 10. This is accomplished by controlling the operation of a cock generator contained within a CP System Console unit Interface (SCUI) device 228. The AU 10 includes a similar SCUI device as will be described.

Also, the CP 12 outputs bits 52 and 53 of a Program Control Register (PCW<52:53>) to AU 10, the PCW bits indicating to the AU 10 the action to be taken during a floating point operation exponent underflow condition and during an intermediate zero result conditon, respectively. PCW<50:51> are employed by the CP 12 to determine whether the CP 12 should generate an interrupt during a fixed-point overflow or a decimal overflow condition, respectively.

A more detailed explanation of the functions of the various signals which comprise the CP/AU bus 14 will now be made in the context of the block diagrams of FIGS. 2a-2e and in conjunction with the description of the AU 10 microcode, or microinstructions, the format of which is illustrated in FIG. 3.

AU 10 includes several major component subdivisions. These subdivisions are a bus interface section 16 (shown in FIG. 2a), a multiplier (MULT) 18 and arithmetic logic unit (ALU) 20 (FIG. 2b), a shifter (SHIFT) 22 and a microsequencer/exponent arithmetic logic unit (SEQ/EALU) 24 (FIG. 2c). The ALU 20 includes the four floating point registers (FPR0-FPR6) 20a, each of which is 56 bits in length. The SEQ/EALU 24 includes four floating point exponent registers (EFPR2 172-178) each of which is eight bits in length and which provide seven bits of exponent and one sign bit. The AU 10 further includes a Scratch Pad RAM 114 (FIG. 2a), a system console unit interface (SCUI) 180 (FIG. 2c) and a cache data bus (CDB) interface 110 (FIG. 2a). The overall logic flow and control of these component subdivisions is controlled by microcode which is stored in a Control Store RAM 26 (FIG. 2c). Control Store RAM 26 is comprised of 4,096 locations, each location being 96 bits wide.

The format of a 96 bit microinstruction word is shown in FIG. 3 wherein it can be seen that the microinstruction word is divided into a number of data fields of variable bit length. The addressing of a particular microinstruction is accomplished by the SEQ/EALU 24 which provides 12 address inputs to the control store RAM 26.

The first microinstruction field, bits zero and one, is a two bit Timing field which defines the microinstruction cycle time to have a duration of from four unit clocks to seven unit clocks. A CP CLK or AU CLK period is defined to be four unit clocks unless the period is extended by the Timing field contents or is extended, for example, by a cycle extend via test false condition. A CP 10 request for synchronization (RFS) can cause an additional extension of at least one unit clock. The operation of the RFS will be described in detail below.

The second field of the microinstruction is a one bit field which controls the operation of the ALU register data multiplexer (ADMUX) 28. That is, the ADMUX field controls the source of the ADMUX 28 data to be either an ALU multiplexer (ALUMUX) 30 or an AU memory data bus (AUMEM) 32.

The next microinstruction field BBUS controls an ALU B bus (BBUS) 34. BBUS 34 is sourced from a floating point address register 1 (R1) 36 or from an ALU register B (ARB) 38 or the AUMEM 32 depending on the state of the ACMD microinstruction field (to be described).

The next microinstruction field is a single bit field which controls an ALU A bus (ABUS) 40. Depending on the state of the ABUS bit the ABUS 40 is sourced from either an ALU floating point address register 2 (R2) or from an ALU register A (ARA) 44.

The next microinstruction field is a one bit field which zeroes the high byte (DISHB) on both the ABUS 40 and the BBUS 34. The high byte is defined as bits 0-7.

The BPORT field of the microinstruction causes the BPORT BUS 46 to receive data from the BBUS 34 shifted left one or four bit positions or unshifted, or to receive data from an AU data transfer bus (AUBUS) 48. The two bits of the BPORT field control a BPORT multiplexer 50 in order to accomplish these various data manipulations.

The next microinstruction field is a single bit APORT field which controls the ALU APORT 52. Depending on the state of the APORT bit the APORT 52 receives data from the ABUS 40 either unshifted or shifted left four bit positions. These operations are controlled by an APORT multiplexer 54.

The next field of the microinstruction is a four bit ALU field which controls the operation of an arithmetic/logic unit ALU 56. ALU 56 is implemented as a two's complement, binary ALU and receives inputs from the APORT 52 and the BPORT 56 and performs various logical or arithmetical operations on the data in accordance with the four bit coding of the ALU microinstruction field. These operations include addition, subtraction, decimal addition and logical operations such as Exclusive Or. All ALU 56 output is directed through ALUMUX 30 and then to the ADMUX 28. Several logic circuits, to be described, act upon the ALU output but these actions are not generally controlled by a microinstruction.

The next microinstruction field is a two bit CIN field which controls the operation of the ALU 56 carry-in bit 58. Depending on the state of the bits of the CIN field the carry bit is zeroed, set to a one, set equal to a previous carry or is made equal to the most significant bit of the multiplicand register A (MRA) 60.

The next microinstruction field is a two bit ALU MUX field the state of which controls the operation of the ALU MUX 30.

In accordance with one aspect of the invention for BCD arithmetic operations a single cycle ALU 56 BCD addition or subtraction is achieved using a two's complement adder/subtracter as opposed to a three cycle operation which is required for known, conventional BCD arithmetic operations. Referring briefly to FIG. 8 there is shown in FIG. 8a an exemplary BCD addition without a carry and in FIG. 8b an exemplary BCD addition with a carry. In that the ALU 56 is implemented as a two's-complement binary ALU BCD operands are first biased by plus six for each digit of the operand on the ABUS 40. The binary result of the biased BCD ALU operation is then reverse-biased by subtracting six from each digit, except for digits which generate a carry during the addition operation. Conventional systems normally require three ALU cycles: one to first add, or bias, the operands with 6, one to accomplish the binary addition and one to subtract 6 from the result. The AU 10 of the invention overcomes this three cycle limitation by including combinatorial logic (BCD Valid 56c) directly within the ALU data path to test in parallel and to indicate that each digit of the operand is a valid BCD digit and other logic (block 56a) to bias each digit of an operand by six before the operand is applied to the ALU 56. In addition, other logic (block 56b) is provided to reverse-bias by minus six each digit of the result which did not generate a carry. The minus six logic 56b has sixteen input signals, designated collectively as NHDCRY (no hex digit carry), which are provided by the ALU 56 to indicate which digits generated a carry during the ALU operation. Thus, only one ALU 56 cycle is required as opposed to the three required for conventional systems, resulting in a speed improvement of approximately three. BCD subtraction does not employ an initial biasing of plus six before application of the operands to the ALU 56.

This aspect of the invention results from a realization that, for an operand comprised of valid decimal digits (0-9), adding +6 can never cause a digit carry. Therefore an ALU having full carry propagate logic is not required for biasing; instead a relatively less complex and faster circuit to bias each digit can be employed. Also, if both operands are known to be comprised of valid decimal digits then a subtraction of six from digits without a carry can never cause a borrow across digits. Once again, this can be accomplished with a biasing circuit that is both less complex and faster than a full carry propagate ALU.

The next microinstruction field is the LR1 field which causes the floating point address register designated in R1 36 to be loaded from ADMUX 28. The adjacent field is a single bit field LARA which loads the ARA 44 from the output of the ADMUX 28. The next consecutive microinstruction field is a two bit field LARB which causes the ARB 38 to be loaded from either ADMUX 28 or from AUBUS 48.

The next microinstruction field is the AOUT field which controls the source of the data which is placed on the ALU output bus (AOUT) 62. Depending on the state of the two bits of the AOUT field the AOUT bus is not driven by the ALU 56, is driven from ADMUX 28, driven from BBUS 34 or is driven from APORT 52. AOUT 62 is coupled through tranceivers 64 and is applied to the AUBUS 48. It can be seen that if the source of data is the BBUS 34 or APORT 52 that the data is applied through a multiplexer 66 whereas if the source of data is ADMUX 28 the data is applied to AOUT 62 through a driver 68. Multiplexer 66 and driver 68 act together as a 3-1 multiplexer.

The next consecutive microinstruction field is the ALU command (ACMD) field which is a three bit field which controls the operation of the ALU 56. Also, an automatic normalization (AUTONORM) 70 is employed to automatically normalize floating point numbers in the ALU 56. This AUTONORM function may be employed in two different modes, specifically, a signed or an unsigned mode.

Bits 26-30 of the microinstruction comprise the SBMUX field, the SAMUX field and the SBMUX field. The SBMUX field is a two bit field which controls the B multiplexer shifter (SBMUX) 72. The logical state of the SBMUX field bits force the output of SBMUX to a zero or select either the AUBUS 48, the shifter register B (SRB) 76 or the shifter register A (SRA) 78 as inputs to the SBMUX 72. The two bits of the SAMUX field operate in a similar fashion for selecting the inputs to a multiplexer shifter (SAMUX) 74. The outputs of the SBMUX 72 and the SAMUX 74 are applied to a shifter/masker (SHIFT/MASK) 80. SHIFT/MASK 80 accepts 128 bits of input, 64 bits from the SBMUX 72 and 64 bits from the SAMUX 74, and provides 64 bits of output. Data is shifted right by increments of four positions as sourced from the SAMUX 74 and filled on the left as sourced from the SBMUX 72. Effective left shifts are accomplished by employing negative shift count values and sourcing SAMUX 74 and SBMUX 72 appropriately. The aforementioned SRMUX field controls the operation of the shifter output multiplexer (SRMUX) 82 to accept data either from the SHIFT/MASK 80 or a shifter register C (SRC) 84. The output of SRMUX 82 is the 64 bit shift output bus (SBUS) 86.

Bits 31-35 of the microinstruction are defined as the LSRA field, the LSRB field, and the LSRC field. The LSRA and LSRB field are each a two bit field which control the loading of the SRA 78 and SRB 76 registers. Each of these registers is loaded from either the SBUS 86, from the AUBUS 48 or from the AUMEM BUS 32. The selection of the source of load data is accomplished by the associated multiplexers 88 and 90. The LSRC field loads the SRC 84 register from the SHIFT/MASK output when this bit is set.

The next consecutive bit of microinstruction is defined as the SOUT field and, when set, activates a tranceiver 92 to drive the SBUS 86 onto the AUBUS 48.

The next eight bits of microinstruction, namely bits 37-44, are differentiated into two four bit fields SCMD0 and SCMD1. The SCMD0 and SCMD1 microinstruction fields operate in conjunction with the operand 1 virtual address register (OP1VA) 94 and the operand 2 virtual address register (OP2VA) 96. These microinstruction fields also operate in conjunction with the operand length (L1/L2) registers 98, the hold count register 100 and the shift/align/mask control logic 102. The output of the SHIFT/MASK 80 is applied to a decimal pack/unpack logic block 104 and to decimal sign 1 (DSGN1) 106 and decimal sign 2 (DSGN2) 108 registers. Fields SCMD0 and SCMD1 control the loading of the OP1VA 94, OP2VA 96 and the L1/L2 reqisters 98 and also control the generation of the eight cache load byte enable interface signals (CBYTE_LE<0:7>) as will be described.

In accordance with an aspect of the invention OP1VA 94 and OP2VA 96 are loaded from the virtual address (VA<29:31>) interface signal lines, these interface signal lines reflecting the state of the least significant three bits of the CP 12 virtual address associated with the operands stored in the cache memory. The higher order bits of the virtual address, obtained from CP 12 instruction register IR1 204, are translated by CP 12 to a physical address and applied to the cache memory 200. The lower order bits received by AU 10 are indicative of the alignment of a particular operand within the cache memory while the operand length registers L1/L2 98 indicate the total operand length in bytes. Logic 102 is thereby enabled to determine from both the memory alignment and operand length fields the number of double word reads required in order to entirely fetch the operand. The number of double word reads required is translated into a multiway (NWAY) branch to the microinstruction location responsible for reading the operands from the cache. The NWAY data is also supplied to CP 12 on interface signal lines AUNWAY<0> and AUNWAY<1> such that the CP 12 synchronously executes the same NWAY branch as the AU 10 in loading the operand data from the cache memory 200 or when storing the result.

The next consecutive two bits of the microinstruction define the AUMEM field which controls the AUBUS 48 and AUMEM BUS 32 selection and operation. One logical state of the AUMEM field sources the cache data bus (CDB) 110 to the AUMEM BUS 32. Normally, the CDB 110 is driven by the value on the AUBUS 48. An exception to this case allows the CDB 110 to not be driven by the AU 10, thereby allowing for the reception of data by the cache from the CP 12. Other states of the AUMEM field allow for floating-point sign/exponent merging by sourcing bits 0-7 of the AUMEM BUS 32 onto bits 0-7 of the AUBUS 48 via the FPMERGE driver 112.

The AU 10 further comprises the aforementioned scratch pad RAM (SPRAM) 114 which is organized as 256 locations by 64 bits. Associated with SPRAM 114 is a RAM parity memory 116. One state of the AUMEM field is employed for indexed SPRAM 114 accesses wherein the SPRAM most significant address bits are driven by the microinstruction register (MIR) 120 bits (51-54) and the four least significant bits of the SPRAM 114 address are driven by the contents of the multiplier bus (MBUS) 118 from the previous cycle.

Bits 46-50 of the microinstruction define the multiply command (MCMD) field which, for example, controls the setting of the condition codes in the two bit condition code register 122. The two bit AU condition code interface signal lines (AU_CC <0:1>) are set as a result of floating point operations or decimal operations. The AU_CC<0:1>signal lines are provided to CP12 such that a CP 12 instruction which requires the use of condition codes which are generated during an AU 10 operation is enabled to test the generated codes. Additionally, the MCMD field initializes the AU 10 for divide and multiplication operations and multiplies the MRA 60 by the multiplier register (MPLIER) 124. In addition, the MCMD field loads the SPRAM 114 from the contents of the AUBUS 48 at an address specified by the microinstruction register (MIR) 120 or the index register 126. In this regard the MULT 18 includes a pair of cascaded Carry Save Adders (CSA) 60a and 60b and a Carry Propagate Adder (CPA) 60c for binary data multiplication. In addition, the CSAs and CPA are employed for floating point multiplication and for the formation of multiples for floating point division. The next consecutive microinstruction field is an eight bit SPRAM field which defines the SPRAM 114 address for read and write operations. During a SPRAM 114 read operation the 64 bit output data is sourced onto the AUMEM bus 32.

Bits 59 and 60 of the microinstruction define a two bit SCOUNT field which selects the values to be sourced to the SHIFT/MASK 80 when the aforementioned SCMD0 field indicates that the SCOUNT field is to be employed. The specific values to be employed are selected by a multiplexer 128 and include shifting by an absolute value of a previous cycle exponent ALU (EALU) 134 value provided from an exponent difference latch 130 and an absolute value register 132, shifting by a value indicated in the MIR branch field bits 89:92 (to be described below) and shifting by a value indicated by a minus leading hex zero count register 148 (MZCNT). The SCOUNT field also indicates that a request for synchronization (RFS) with CP CLK is required, the RFS operation being described in detail below.

Microinstruction bit 61 defines the EALU register data multiplexer (EDMUX) 136 control bit. EDMUX 136 is controlled by this bit to source either the exponent/sign bus (EBUS) 138 or to source the AUMEM BUS 32.

Microinstruction bits 62 and 63 define the EALUB-Port field and the state of these two bits determine the source of data for the EALU B PORT (EBP) 140. The source of data may be the EALU register 1 (ER1) 142, the EALU register B (ERB) 144, the AUMEM BUS 32, via tranceiver 146, or the MZCNT signal from the minus leading hex zero counter 148.

Microinstruction bit 64 is the corresponding EALU A-PORT signal which defines the source of data for the EALU A-PORT BUS (EAP) 150. This source of data may be either the EALU register 2 (ER2) 152 or the EALU register A (ERA) 154.

Bits 65 and 66 of the microinstruction control the operation of the floating point exponent ALU (EALU) 134 while bits 67, 68 and 69 of the microinstruction each define a one bit field referred to as the load exponent register designated in R1 (LER1), load exponent register A (LERA) or load exponent register B (LERB), respectively. Each of these one bit fields, when asserted, causes the respective register to be loaded with the output of EDMUX 136. Depending on the state of these two bits the EBUS 138 is caused to equal either the EBP BUS 140, the sum or the difference of the EBP 140 and the EAP 150 or the EBP 140 plus the EAP 150 plus one.

Microcode bits 70-74 define a five bit field designated as the EALU/sequencer command (ECMD) field. These five bits define a number of operations of the EALU/sequencer 24.

Bits 75-78 of the microinstruction define the microaddress control (MAC) field which controls the operation of the micro-sequencer. In general, this field selects the next microinstruction address (MIA) 156 which is applied to the control store RAM 26. The MIA 156 is sourced from a MIA multiplexer 158 which in turn is controlled by a test select logic block 160. The MIA multiplexer 158 is fed by a test true bus 162 and a test false bus 164 and selects between these two buses based on the output of the test select block 160. Inputs to the test true and test false buses 162 and 164 include the MIR register 120, a multi-way branch block (NWAY) 166, a microprogram counter (MPC) 168 and a stack 170. The stack 170 includes four 12 bit registers and functions as a four level microinstruction address stack which allows nesting of microinstruction subroutines. The test microinstruction field, bits 79-83, defines a number of conditions which, if determined to be true or false, influence the selection of a next microinstruction address and the length of the current microinstruction cycle. These conditions include conditions wherein the ALU result is zero or the state of the most significant bit of the ALU output, indicating a sign of the result. In addition, certain test conditions are related to BCD arithmetic, such as a condition which tests to see that the AUBUS 48 contains all valid BCD digits, and other test conditions that relate to floating point instruction execution, such as normalization and overflow/underflow.

Microinstruction bits 84-92 define the nine bit branch field. The branch field specifies nine bits of next address for JUMP and CALL operations, wherein certain MIA 156 bits are set equal to certain of the MIR 120 bits. For multiway branch operations (NWAY) the five high order bits of the branch fields specify a portion of the target address. The low three order bits select the type of multiway branch. In this case MIA 156 bits 3-8 are set equal to the MIR 120 bits 84-88. As an example, an NWAY branch may be accomplished by floating point add variables wherein MIA 156 bits 8-11 are set in accordance with the value contained in, for example, the exponent difference register (EXPDIFF) 130.

In addition, for storage to storage (SS) operands MIA(08:11) indicate the following conditions: MIA(08:11) equals 1100 ($C_{16}$) when one doubleword read is required, equals 1000 (8) when two doubleword reads are required and (L+1) is less than or equal to eight, equals 0100 (4) when three doubleword reads are required and equals 0000 when two doubleword reads are required and (L+1) is greater than eight. MIA(08:09) are provided to CP 12 on the aforementioned AUNWAY<0:1> interface signal lines so that the CP 12 is enabled to execute the required number of cache read or write operations in conjunction with the AU 10. As has been previously mentioned, the AU 10 determines the number of cache read or write cycles required for a particular operand as a function of the operand alignment, as indicated by VA<29:31>, and the length of the operand, as indicated by bits 8-15 of IRO as stored in L1/L2 98. The AU 10 also provides this information to CP 12 such that both units operate in tandem to read operands and store results in the CP 12 cache memory. This aspect of the invention will be further discussed below in relation to the flow chart of FIG. 5d.

For unconditional branch type operations a portion of the test field is employed to specify a 12 bit microinstruction address in the branch and test fields.

In addition, the AU 10 of the invention is operable for executing an alternate instruction set (AIS). The AIS microinstruction bit (bit 84) permits the AU 10 to execute more than one instruction set from the control store RAM 26 without having to reload the control store RAM. Normally, some number of control store RAM locations are initially loaded with microinstructions which implement a first instruction set while some other number of locations may be initially loaded with microinstructions which implement a second instruction set. When the AIS bit is off the AU 10 dispatches into the first instruction set microcode routines. When the AIS bit is on, the AU 10 dispatch is a function of the state of the AISMODE microinstruction bit 89. If AISMODE is on the AU 10 dispatches into the second instruction set microcode routines. If AISMODE is off the AU 10 dispatches into a predetermined location which, in conjunction with the CP 12 command and interface line AUI (to be described), may activate the AU 10 for any specific routine. In this case the AU 10 dispatches from the contents of CDB(24:31) as opposed to IRO(0:7).

Microinstruction bit 94 is designated as a break bit and, when set, enables the operation of AU 10 break point indications. This is accomplished by stopping the AU clock during execution of a microinstruction and yielding further clock control to the system console unit interface device 180. Bit 95 is a parity bit for the microinstruction word.

Having thus described the various operational blocks of the AU 10 in light of the microinstruction format a further description will now be given of the AU 10 interface with CP 12, including the cache memory, and the interface timing.

Both the AU 10 and CP 12 have identical clock control and generation in that each are provided with the system console unit interface (SCUI) 180 device. In addition to providing an independent data path (DCDATA in FIG. 1b) to a system console (not shown) the SCUI 180 functions as a programmable clock generator. Both the SCUI 180 of the AU 10 and the corresponding SCUI 228 of the CP 12 receive the UNIT CLK signal from the backplane and derive the AU clock (AU CLK) and the CP clock (CP CLK) therefrom. The aforementioned Request for Synchronization (RFS) operation is used, in accordance with an aspect of the invention, to force synchronization of the CPCLK and the AUCLK. A RFS coded or hardware initiated on the AU 10 or coded or hardware initiated on the CP 12 is input to the associated SCUI and causes the associated clock to function as programmed. After all programmed unit clock cycles and any cycle extends have expired the clock is caused to remain in an inactive state until the other device also reaches the end of a cycle with RFS coded. Both clocks then simultaneously go active on the next edge of UNIT Clock. The RFS is thus employed to synchronize data transfers between the CP 12 and AU 10.

The RFS is also used by the CP 12 to dispatch instructions to the AU 10, to force the 10 microinstruction address to a desired value, and to abort an in-progress RFS on the AU 10. The RFS mechanism is further used to synchronize NWAY branches, synchronize for test conditions between the CP 12 and the AU 10 (such a OP1VA29, AU_XP and AU_CC) and also to dispatch instructions to the CP 12 when the CP 12 must wait for the AU 10 to go idle. One example of this latter condition is an ILOCK condition wherein the CP 12 is waiting for the AU 10 EOC signal to be asserted before proceeding with the dispatch to a next instruction. For the CP 12 the CP_RFS is generated in accordance with the expression CP_RFS = [CP_RFS_CODED or (ILOCK_DISP and AUBUSY) or AUINST] and TRAP*, while for the AU 10 the RFS is generated in accordance with the expression AU_RFS = (AU_RFS_CODED or AUDISP_TKN) and TRAP*.

Other expressions which describe certain operations of the CP 12 are as follows. The AU Dispatch Exception (AU_DISPX) condition is described by the expression AU_DSPX = CP_RFS_CODED and ILOCK and AUBUSY and OTHER_DSPX* and IN_DISPX*, where OTHER_DISPX* indicates that no other dispatch exceptions are pending and where IN_DISPX* indicates that dispatch exception processing is not inhibited on the CP 12.

The CP 12 AU Exception Trap is taken when the previous cycle was a successful CP 12 dispatch and the AU_XP signal was asserted:

CP_AUXP_TRAP = PREV_CYCLE [CPDISP_TKN and AUXP].

Other expressions which describe the operation of the AU 10 include the following.

The AU 10 dispatch exception (DSPX) is described by:

DSPX = (AUDISP_TKN and AUXP and AUI*).

The CP Not Ready state is described by the expression

CPNREADY = PREV_CYCLE[AUDISPTKN and CPDISPTKN* and AUI*].

Figure 7A:
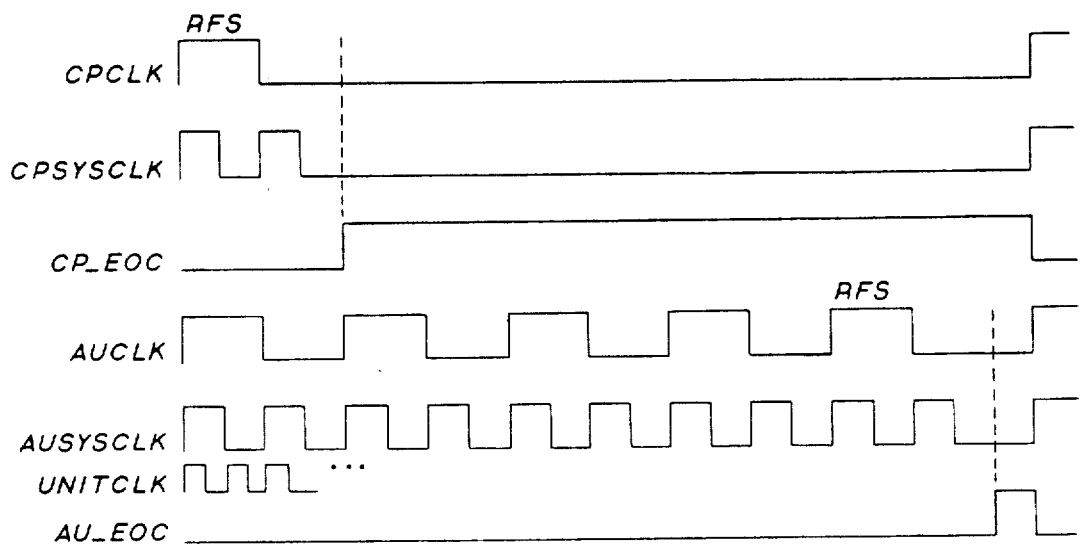
FIGS. 7a and 7b are timing waveforms which show the synchronization of cycle clocks on the CP and AU.
Figure 7B:
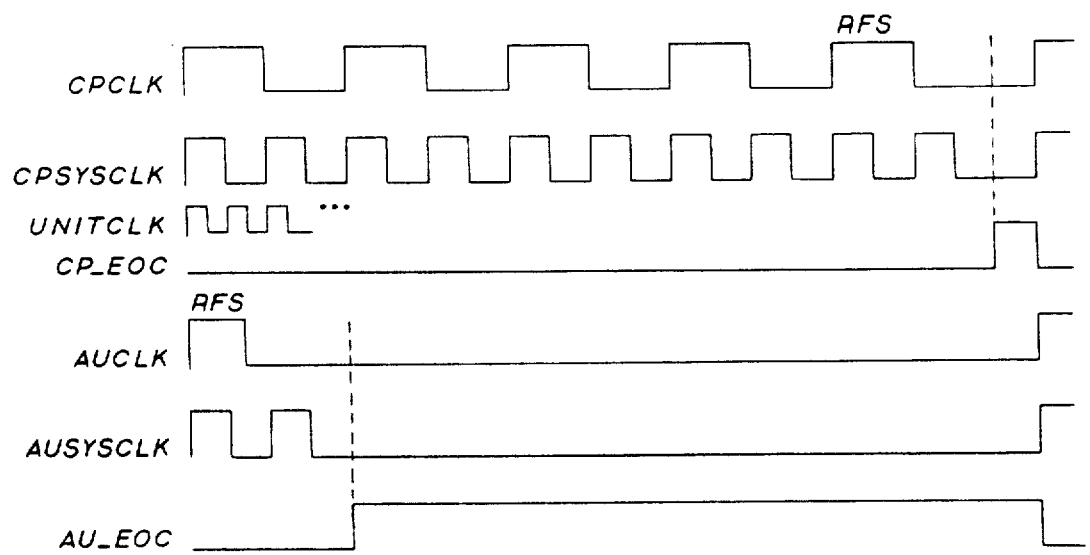

The aforedescribed RFS aspect of the invention is shown in FIG. 7a for synchronization of the CP 12 to the AU 10 and in FIG. 7b for synchronization of the AU 10 to the CP 12. As can be seen, AUCLK is half the frequency of AUSYSCLK which in turn is half the frequency of UNIT CLK when four unit clocks are coded in the microinstruction Timing field and cycle extend is not active. In FIG. 7a the CP 12 executes a RFS and thereafter holds CPCLK and CPSYSCLK low, thereby suspending further operation. In addition, interface signal CP_EOC (end of cycle) is active. This condition is maintained for as long as the AU_EOC interface signal remains low. At some later cycle AU 10 executes an RFS and thereafter asserts the interface signal AU_EOC. The simultaneous presence of both the CP_EOC and the AU_EOC causes both the AU 10 and the CP 12 clocks to start in synchronism at the next edge of UNIT CLK. FIG. 7b illustrates the alternate case where the AU 10 finishes an operation and asserts AU_EOC and waits for the CP 12 to encounter a cycle with RFS asserted.

As can be seen, the granularity, or latency, for synchronization of the CP 12 and the AU 10 is approximately one quarter of the CPCLK or AUCLK and is a function of the UNIT CLK period. This is a significant improvement over conventional systems of the type where a central processor executes dummy instructions, such as NOP instructions, while waiting for another device to finish. As can be appreciated, even if the dummy instruction requires only one clock period the dummy instruction may just start when the other device comes ready. Thus, the entire execution period of the dummy instruction must be incurred before both devices can be synchronized.

Figure 7C:
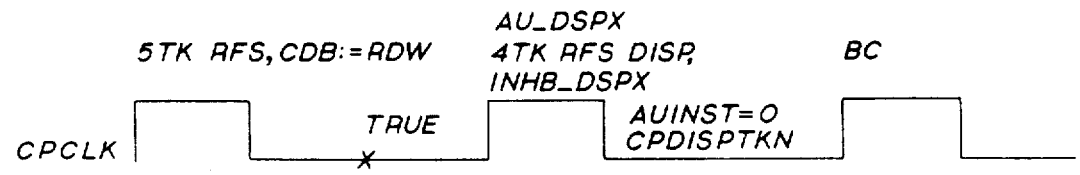
FIG. 7c shows clock control and cycle sequence for a register to memory floating-point addition followed by a branch conditional instruction.
Figure 7C:
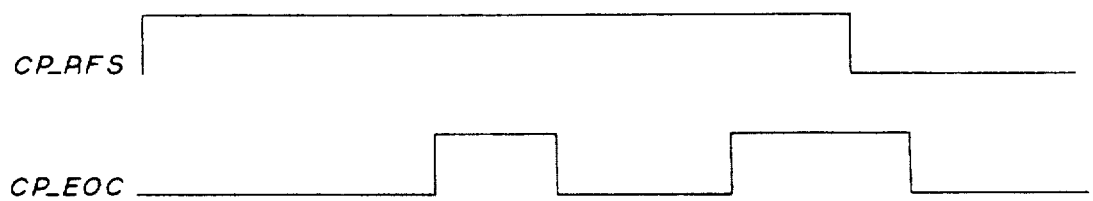
Figure 7C:
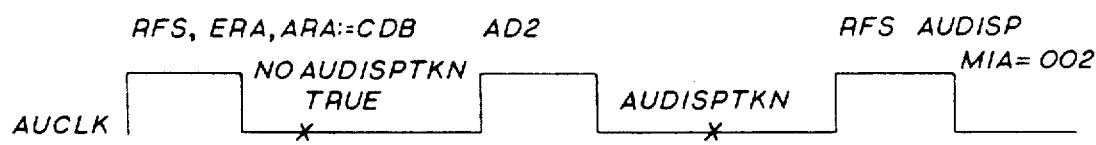
Figure 7C:
Figure 7C:
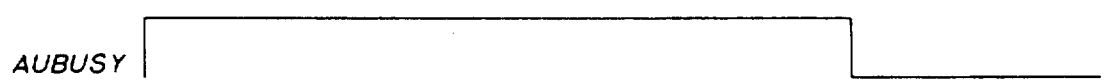

FIGS. 7c-7l show other synchronization relationships between the AU 10 and the CP 12. For example, FIG. 7c illustrates a typical interlocked type of instruction execution where a Floating Point Add (AD) register to memory operation is followed by a Branch on Condition Code (BC) type operation. The instruction is interlocked in that the branch instruction cannot be executed by the CP 12 until the AU 10 completes the AD operation and determines new condition codes therefrom. FIG. 7c illustrates the case wherein OP1VA29 is not asserted.

More specifically, OP1VA29 is relevant in all double precision FP RX instruction types and the interface of the invention facilitates their operation when a double precision FP double word crosses the cache double word boundary. In this regard, single precision FP operands occupy one word aligned cache word, or 32 bits. Double precision FP operands occupy one word aligned cache double word and, as such, may be entirely within one cache double word (VA<29:31> = 000) or within two contiguous cache double words (VA<29:31> = 100). It can be seen that VA<29> is indicative of the double word alignment of a double precision FP operand. The state of VA<29> is registered by the AU 10 at the beginning of a FP operation and provided back to the CP 12 on interface signal line OP1VA29 to indicate to the CP 12 the number of cache write access cycles, namely one or two, which are required to store the double precision FP result.

Further in relation to FIG. 7c it should be realized that the first cycle of a FP RX instruction always requires a cache memory operation and an AU 10 data transfer. Thus a RFS is required for both the AU 10 and the CP 12.

If the next instruction, as indicated by IRO 206, is an ILOCK instruction, such as Branch on Condition (BC), the CP 12 examines the AUBUSY* interface signal line to determine if the BC operation can be started. However, if the FP RX operation is, for example, an ADD, MULT, or DIV, it is known that the AU 10 will be busy throughout the first microcycle in that it has only just received OP2 and still requires a minimum of at least one more cycle to execute the FP RX instruction. Since an RFS is already coded on the CP 12 to accommodate the data transfer the CP 12 cannot issue another RFS and wait for the AU 10 to finish so that the CP 12 can execute the BC instruction. The first cycle is instead terminated as early as possible so that the data transfer can be completed such that the AU 10 can begin execution of the instruction. Thus, for this CP 12 condition (RFS coded AND IRO=INTERLOCK AND AUBUSY* asserted) the CP 12 transfers to a special dispatch target (AUDSPX) where it can issue a second RFS. The CP 12 remains at the AUDSPX dispatch target until the AU 10 is no longer busy, indicating that the condition codes are set, and the BC instruction is executed.

Figure 7D:
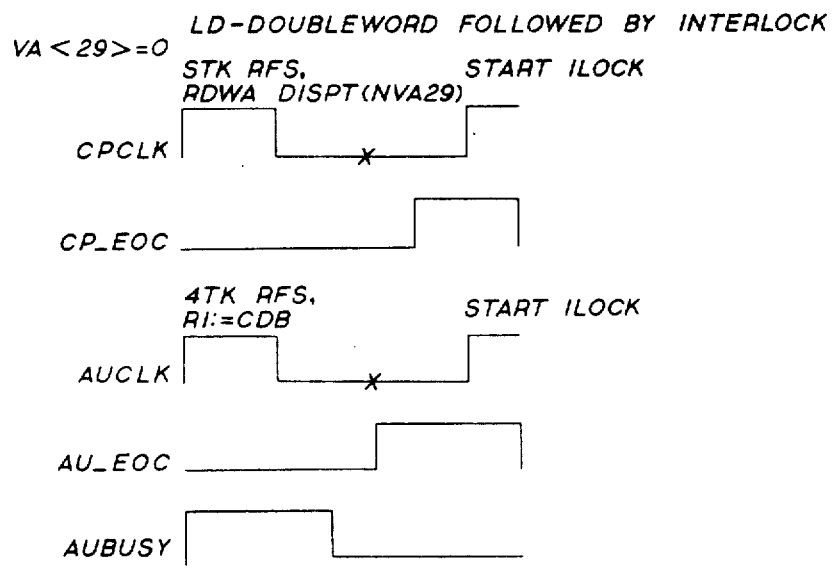
FIGS. 7d and 7e show clock control and cycle sequence for a double precision load without and with, respectively, a cache line crossing, the double precision load being followed by an interlock instruction.
Figure 7E:
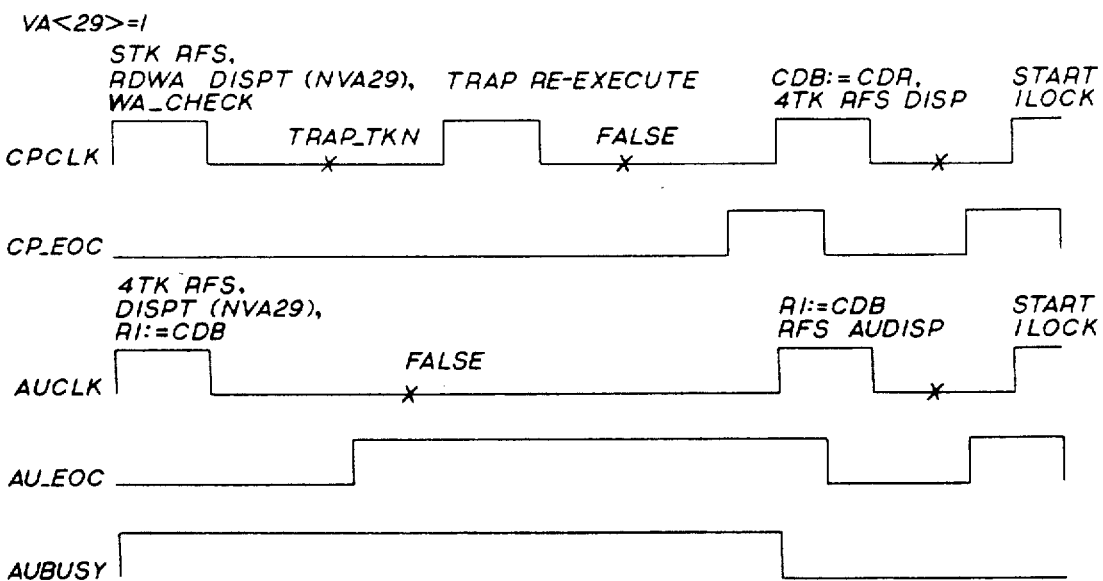

FIG. 7d illustrates a load (LD) doubleword operation wherein OP1VA29 is not asserted and FIG. 7e illustrates the same operation wherein OP1VA29 is asserted. That is, OP1VA29 not being asserted indicates that the double word is entirely contained within one cache 200 double word while the asserted condition indicates that half of the double word is stored in one cache 200 double word while the other half is stored in a next consecutive cache beginning of an interlocked instruction which is synchronized by the RFS mechanism in combination with the UNIT CLK derived timing signals and the respective CP 12 and AU 10 end of cycle (EOC) signals.

In FIG. 7d it can be seen that only one cache 200 double word read is required to entirely fetch the operand. However FIG. 7e shows that the CP 12 determines via PAR <29> =1, OP1VA29=1 and the CP TRAPS logic 236 the number of cycles required to complete the LD instruction. In this case the trap is taken and the first cache 200 double word is read, aligned by alignment logic 240 and stored within the CDR 242. The trap further results in a re-execution, including the incrementing of the cache address, of the cache 200 read operation. The second half of the double word operand is aligned and stored within the CDR 242 in the position required for loading into the destination AU floating point register. Incrementing the address removes the trap condition (PAR 29=0). The subsequent cycle is arrived at because of the original OP1VA29 received from the AU 10 which disallowed the dispatch and caused the continuation of the LD instruction. During this subsequent cycle the CP 12, due to the execution of the Trap, delays generation of the CP_EOC signal until the Trap condition is removed and therefore until the cache data is correctly aligned for the AU 10. The AU 10 thus remains in the RFS condition with AU_EOC asserted until the CP 12 can complete the first RFS cycle.

To summarize, Load instructions trap on PAR <29> and test on OP1VA29 while Store instructions test on OP1VA29 and also memory write inhibit on OP1VA29.

Figure 7F:
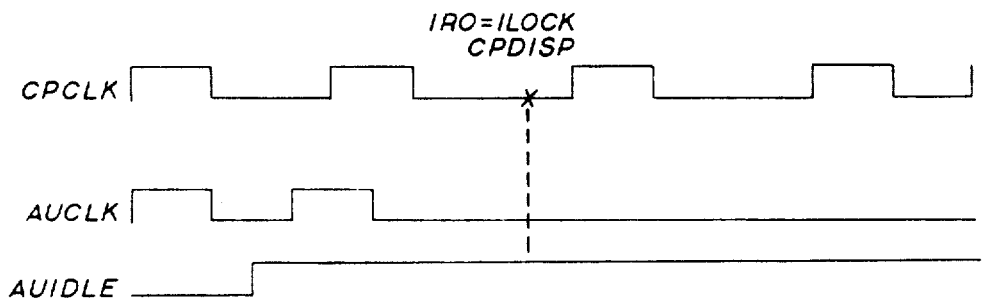
FIGS. 7f and 7g show clock control for the CP encountering an interlock instruction with and without the AU being BUSY.

FIG. 7f illustrates a condition where synchronization is not required when an ILOCK instruction is decoded and the AU 10 is idle. In that AU_CC<0:1> are set when the AU 10 goes idle the CP 12 can immediately dispatch the ILOCK instruction. That is, CP_RFS =0 when ILOCK and AUBUSY is not asserted.

Figure 7G:
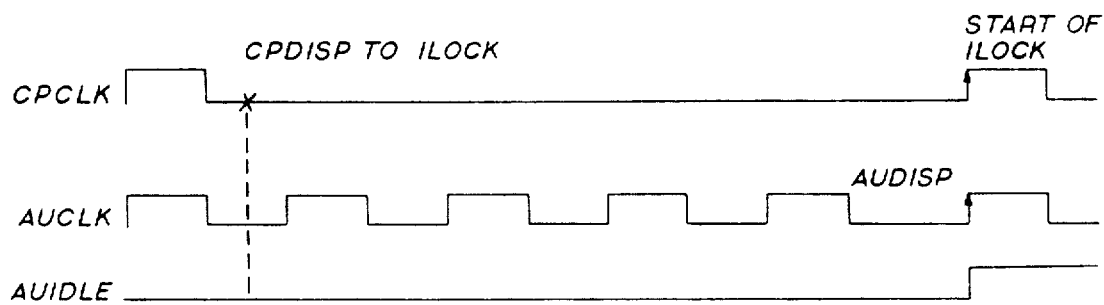

FIG. 7g illustrates the alternate condition when the CP 12 decodes an ILOCK instruction and the AU 10 is not idle. Since the AU 10 is not idle at the CP 12 Dispatch decision point the CP 12 executes an RFS and waits for the AU 10 to reach an RFS cycle.

Figure 7H:
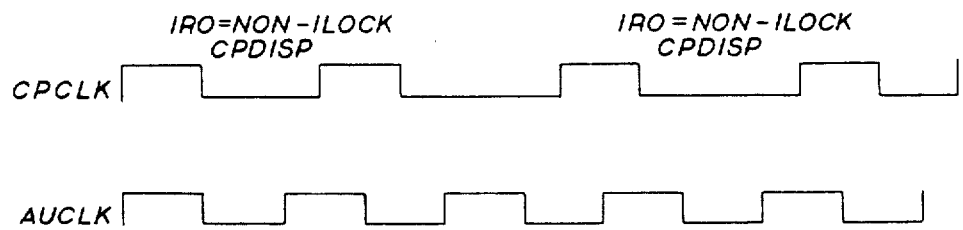
FIG. 7h shows the cycle sequence for the CP encountering non-interlock type instructions.

FIG. 7h illustrates a condition where the CP 12 is executing non-ILOCK, non-AU instructions and the AU 10 is busy. In that synchronization is not required by either device execution continues in parallel as indicated by the asynchronous nature of CPCLK and AUCLK.

Figure 7I:
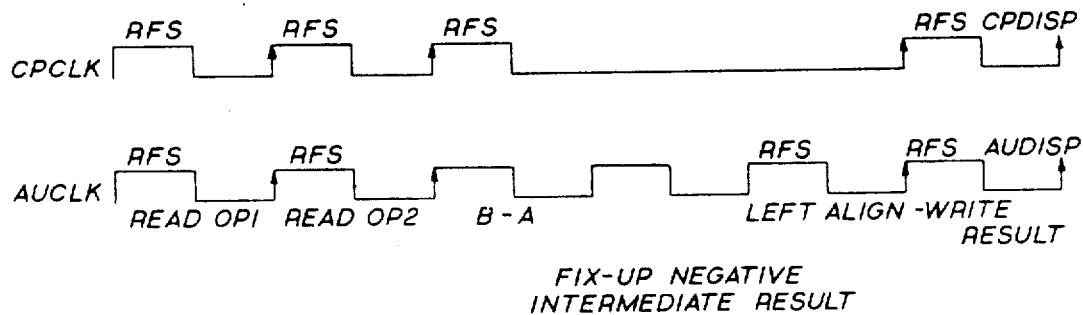
FIG. 7i shows clock control and cycle sequence for storage-to-storage decimal addition.

FIG. 7i shows an example of serial execution by the AU 10 and the CP 12 for SS instruction execution where the AU 10 and CP 12 repetitively synchronize such that the AU 10 reads two operands from the cache 200 and executes the instruction. The CP 12 performs an RFS to wait for the completion of the instruction and the subsequent write back of the result to the cache.

Figure 7J:
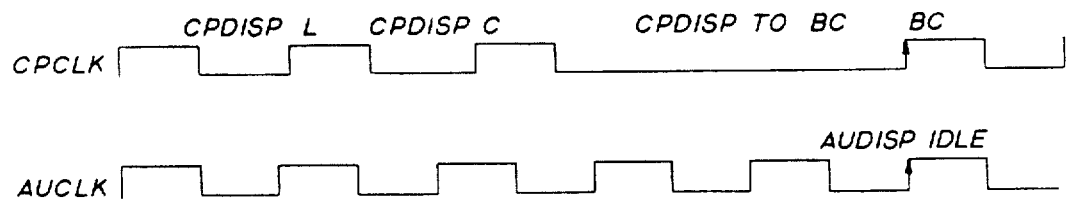
FIG. 7j shows clock control and cycle sequence for the CP encountering non-interlock and interlock instructions with the AU BUSY.

FIG. 7j illustrates parallel CP/AU operation during a floating point register to register multiply sequence where, after two non-interlocked CP dispatches, the CP 12 decodes an ILOCK instruction and waits for the AU 10 to complete the floating point instruction execution.

Figure 7K:
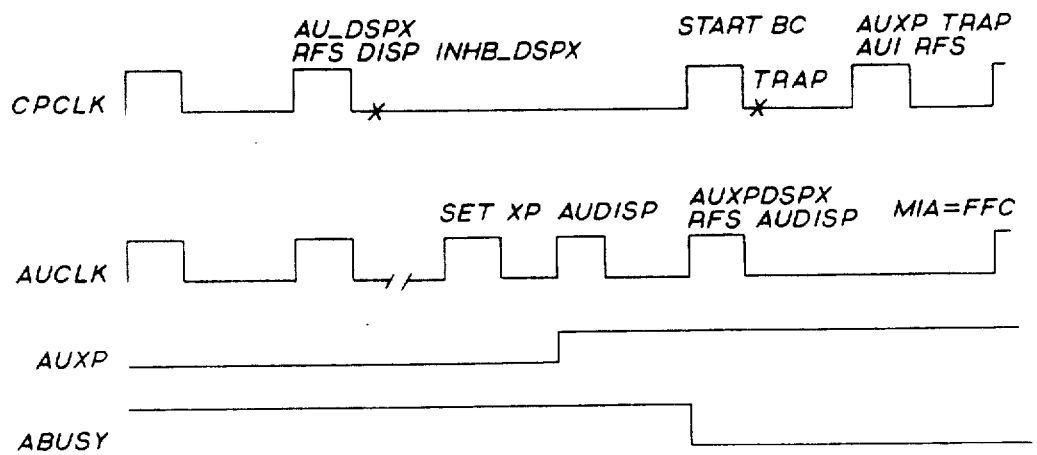
FIG. 7k shows clock control and cycle sequence for a Floating Point ADD instruction having an exponent overflow, wherein AU_XP is asserted, followed by a conditional branch instruction.

FIG. 7k illustrates a FP ADD instruction having an exponent overflow and thus illustrates a condition wherein AU_XP is asserted. The FP ADD instruction is followed by a conditional branch instruction. Because the CP 12 is in the AU DISPX with RFS coded the AU 10 must complete the current instruction before the CP 12 can proceed. Thus, AU_XP is asserted prior to the time that the CP 12 dispatch occurs to the BC instruction. As a result, the CP 12 executes an AUXP trap on the next microcycle in order to report an interrupt condition in the proper program sequence to the user.

Figure 7L:
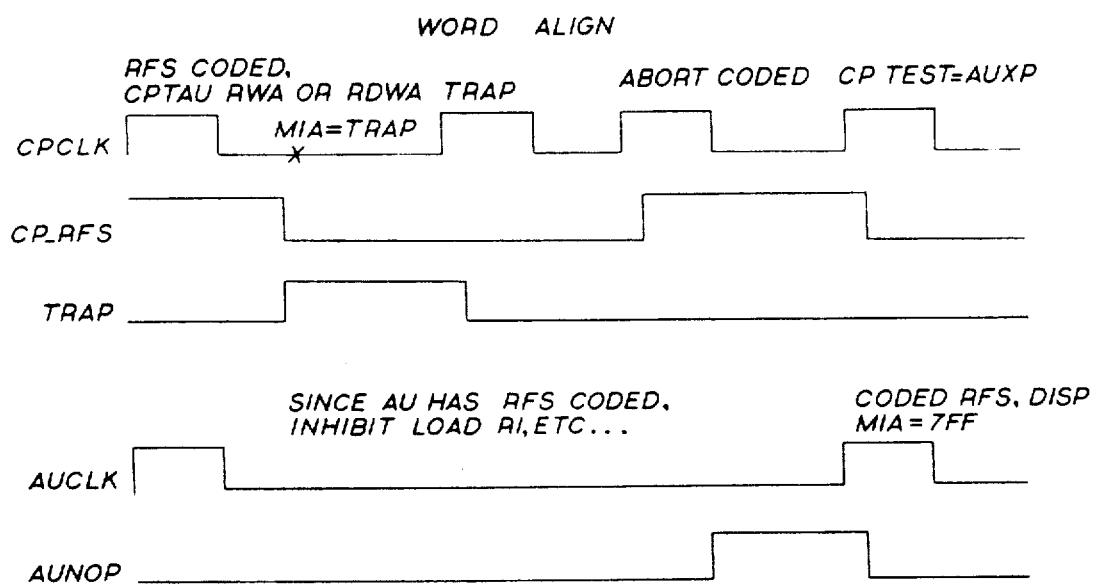
FIG. 7l shows clock control and cycle sequence for a floating point register to memory operation having a non-word aligned data address.

FIG. 7l is an example of a FP register to memory operation having a non-word aligned data address. A CP 12 word alignment trap is taken to a location where an AUABORT is coded. The assertion of the AUABORT interface signal line inhibits the AU loading of the user visible registers. This mechanism may also be applied when the CP 12 must go to disk to load data into the cache and a currently executing task is to be swapped out. It should be noted that the RFS mechanism is disabled on the CP 12 during a trap condition and the AU 10 may either continue after the trap or may be idled without destruction of the current program state.

In dispatching instructions to the AU 10 both the AU 10 and the CP 12 dispatch simultaneously from the contents of IRO 206. When the AU 10 is behind the CP 12 this may indicate that the AU 10 is BUSY executing a previous instruction, such as a Floating Point instruction. There are three conditions which cause the CP 12 to delay its own dispatch to a next instruction until the AU 10 can also dispatch. These include dispatching to an AU instruction, dispatching to an ILOCK instruction when the AU 10 is BUSY and by coding an RFS on the CP 12, such as in the previously given example (FIG. 7c) of coding a RFS at the AUDSPX target location.

Figure 4A:
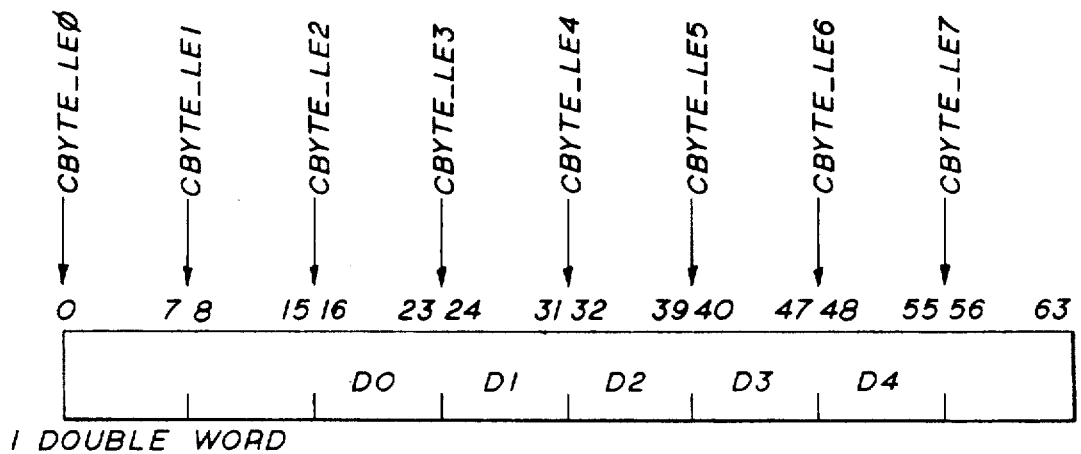
FIG. 4a, 4b and 4c show various possible alignments of string operand data within the cache memory.
Figure 4B:
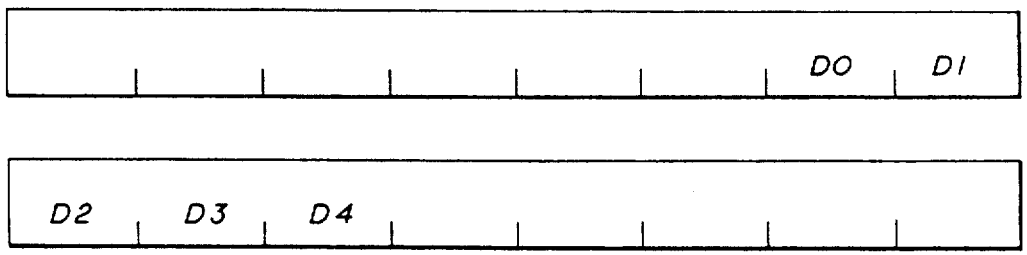
Figure 4C:
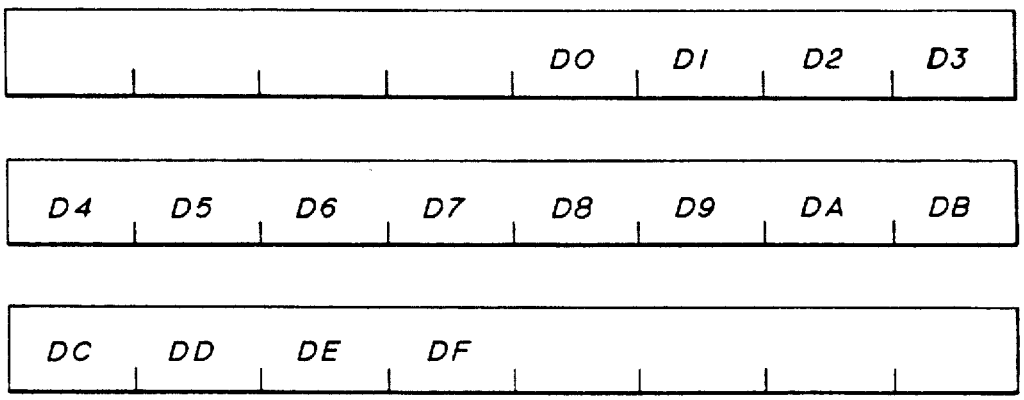

In accordance with the foregoing description of the RFS operation reference is now made to FIGS. 4a, 4b and 4c where there are shown several exemplary arrangements of operand or result data bytes, indicated by D0, D1, etc., which are stored within the cache memory 200. As has been stated the cache memory 200 is organized by double words, each word being 32 bits, or four bytes, in length. Thus a cache double word is comprised of 64 bits. FIG. 4a illustrates a five byte operand which is stored at bit positions 16-55 of a cache double word. FIG. 4b illustrates a five byte operand which is stored at bit positions 48-63 of a first cache double word and at bit positions 00-23 of a consecutive cache double word. FIG. 4c illustrates a 16 byte operand which is stored in three consecutive double words. As can also be seen, each of the cache data byte load enable (CBYTE_LE) signals correspond to a particular byte of a cache double word.

In accordance with one aspect of the invention the eight
CBYTE_LE signals are sourced by the SHIFT-/ALIGN/MASK CONTROL logic 102 during operand fetch and store operations and select those bytes of a double word which are required to be written for a particular operation. During floating point double word store operations and when SCMDO=IBLEVA29 all CBYTE_LE signals are forced to an off state when interface signal OP1VA29 is a one in order to inhibit a memory load during a 64 bit cache-line crossing.

Figure 5A:
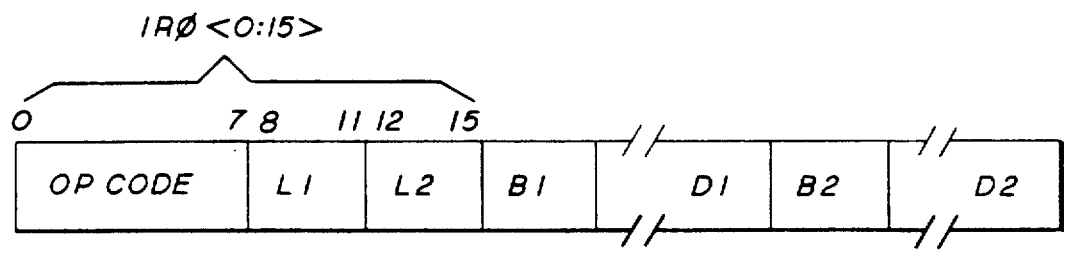
FIG. 5a illustrates an opcode field and operand length fields which are input the AU for a storage-to-storage string-type operation.
Figure 5B:
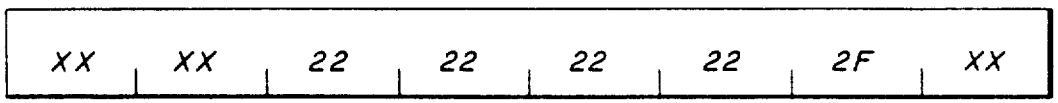
FIGS. 5b and 5c show an illustrative operand 1 and operand 2 for a BCD-type operation.
Figure 5C:
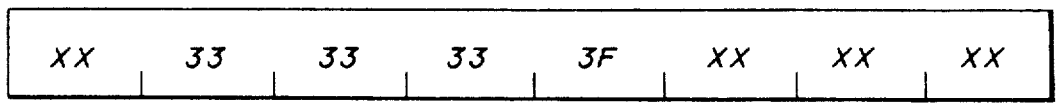

As an example, FIG. 5a illustrates the format of a SS instruction, such as a packed decimal ADD. FIGS. 5b and 5c each illustrate one of the operands referenced by the instruction, it being seen that operand one is a five byte operand while operand two is a four byte operand. The specific instruction identification is normally passed to AU 10 from CP 12 over the IRO<00:15> interface signal lines, eight bits conveying the instruction identification and the other eight bits being differentiated into the four bit L1 and the four bit L2 field. L1 indicates the length of the first operand (where a value of zero indicates one byte and a value of F16 indicates 16 bytes) and L2 indicates the length of the second operand. L1 and L2 are loaded into L1/L2 98 as previously described.

As was previously stated, for certain SS-type instructions IR<08:15> indicates the length of the two operands in bytes. However, for some types of instructions such as string moves IR<08:15> is interpreted as an eight bit field which indicates the number (1-256) of bytes to operate on. Another variation may occur in conversion type instructions where only OP2 is read, the operand is converted, and the result stored in OP1. For comparison instructions OP1 and OP2 may both be read, compared and the result indicated by the AU_CC interface bits without a write-back of any results to the cache 200.

For floating point instructions IRO<08:15> are differentiated into a four bit R1 field and a four bit R2 field which indicate which floating point registers contain operand 1 and operand 2. R1 is loaded into floating point address register R1 36 while the R2 field is loaded into the floating point address register R2 42. IRO<8> indicates single or double precision for floating point operations.

Figure 5D:
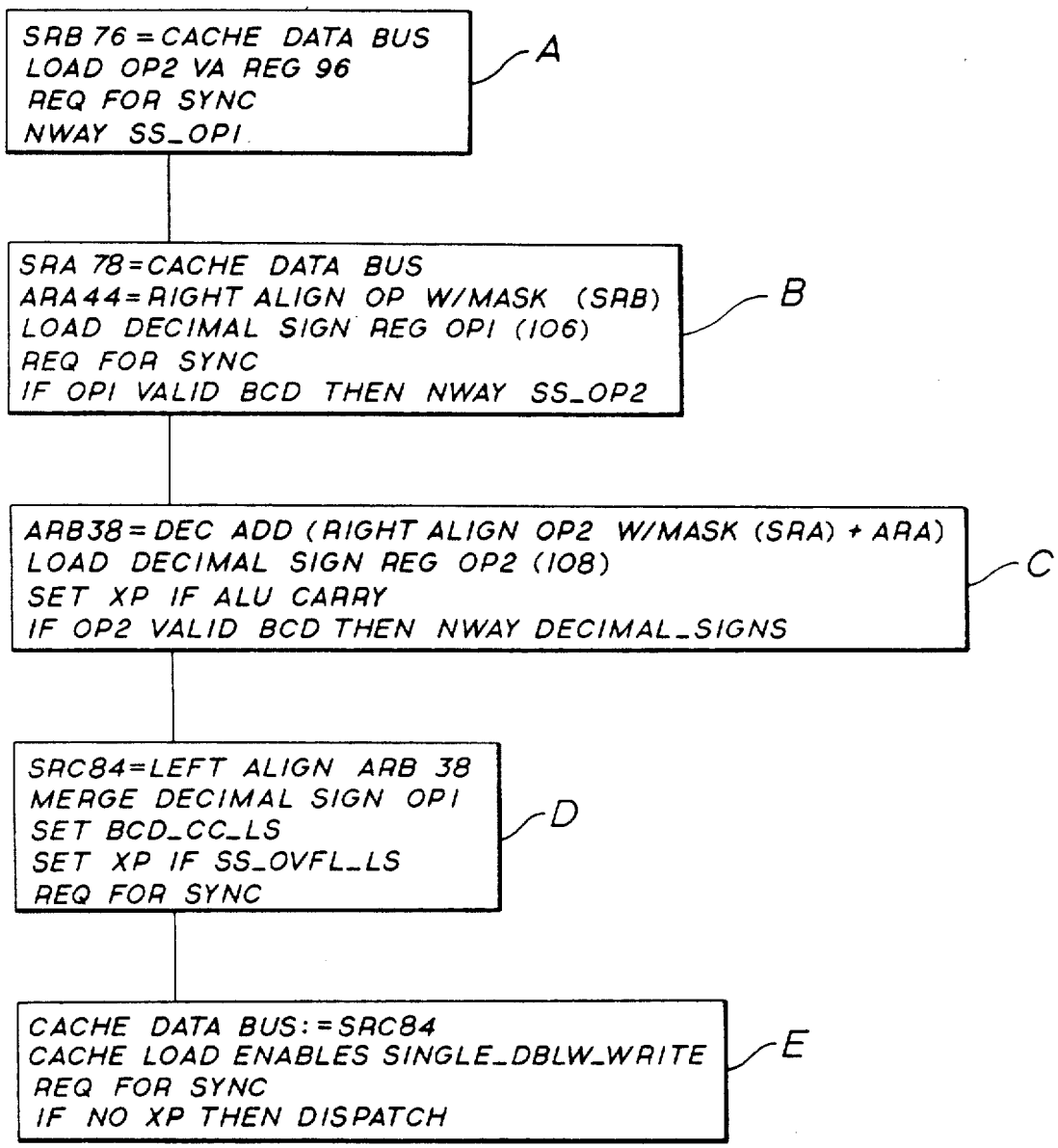
FIG. 5d is a flow chart of the AU operation during the decimal add of the operands illustrated in FIGS. 5b and 5c.

As an example of the operation of the AU 10 and referring to FIG. 5d in conjunction with FIGS. 2a-2e and FIG. 6 there is shown in flow chart form a Packed Decimal ADD instruction after receipt of the instruction from the CP 12.

It should be realized that prior in time to Block A of FIG. 5d the CP 12 instruction decoder 208 decoded in IRO 206 an AUINST, specifically the Packed Decimal ADD. AUINST being asserted caused the CP 12 to generate an RFS which further caused the AU 10 to register IR<00:15> and VA<29:31>. The operand lengths were stored in L1/L2 98 and VA<29:31> were stored in the OP1VA register 94. AUINST being true initiated the CP RFS cycle via CP RFS Generation logic 226 and the CP SCUI 228. After synchronization with CP 12 the Shift/Align/Mask/Control logic 102 generated AUNWAY signals for the CP 12, based on the operand length and alignment as determined from L1 98 and OP1VA 94, in order to access the cache 200 to read the first operand.

In block A it can be seen that SRB 76 receives a double word from the CDB 110 which represents the first read of operand 1. During this time the CP 12 is sourcing the address of the second operand onto VA<29:31>. OP2VA 96 is loaded and a request for synchronization (RFS) with the CP 12 is issued in order to fetch the second operand.

Figure 6A:
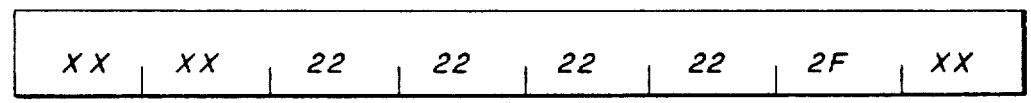
FIG. 6a, 6b and 6c show the contents of various registers within the AU during the addition illustrated in the flowchart of FIG. 5d.
Figure 6A:
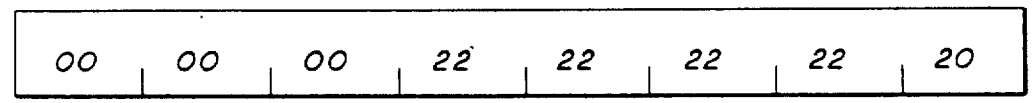

At block B SRA 78 receives the second operand from the CDB 110 and the ARA 44 receives the right aligned and masked first operand from Shift/Mask 80 via transceiver 92, AUBUS 48, transceiver 64, BPORT Mux 50, ALU 56 and ADMUX 28. The right aligned and masked OP1 is tested by the BCD Valid logic 56c during the transfer to ARA 44 to determine if OP1 contains all valid BCD digits. FIG. 6a illustrates the contents of SRB 76 and ARA 44 at this time. The DSGN1 106 is also loaded with the four sign bits of operand 1 and a request for synchronization is issued by the AU 10. If the first operand is determined to be a valid BCD number by BCD Valid logic 56c an NWAY SS_OP2 branch is performed otherwise the microcode path will eventually assert the AU_XP interface signal line to indicate to the CP 12 that OP1 contained one or more non-valid BCD digits.

Figure 6B:
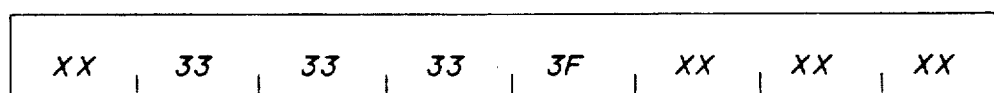
Figure 6B:
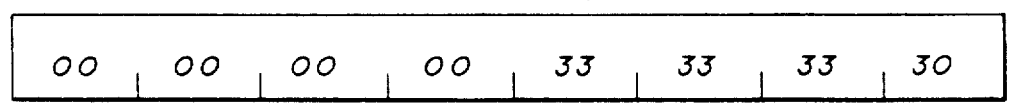
Figure 6B:
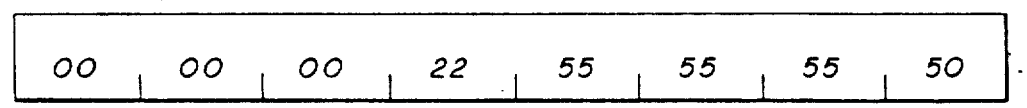

At block C the right aligned and masked OP2 is transferred from the Shift/Mask 80 to the ALU 56. The sign of OP2 is stored in DSGN2 108 and the BCD Valid logic 56c tests OP2 for all valid BCD digits. The ARB 38 is loaded with the result of the decimal addition of the right aligned and masked operand 2 and the previously aligned and masked operand 1. This addition is accomplished as previously described and employs the plus six biasing logic 56a, the ALU 56 and the reverse biasing logic 56b. The AU_XP interface signal is asserted by logic block XP 182 (FIG. 2b) if an ALU Carry (ALUCRY) occurs. Also, if OP2 is determined to be a valid BCD number then an AU 10 internal NWAY Decimal_Signs branch is executed based on the contents of DSGN1 106 and DSGN2 108. In that access to the cache memory is not required for AU 10 cycles which occur during the addition no RFS is issued by the AU 10. The CP 12 may be executing with independent microcycle clocks or may be in an RFS condition waiting for the AU 10 to arrive at a next processing state requiring synchronization. FIG. 6b illustrates the contents of SRA 78 and ARB 38 for this portion of the addition operation.

Figure 6C:
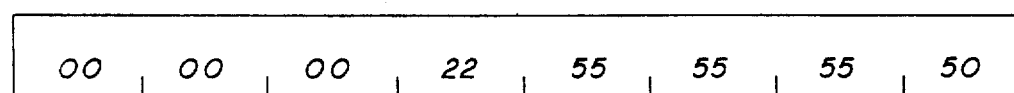
Figure 6C:
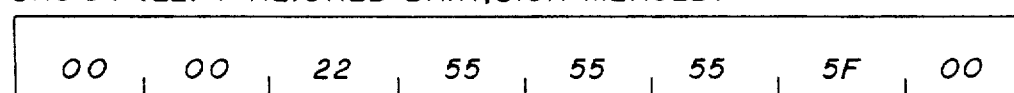

At block D the result stored in ARB 38 is transferred to the Shift/Mask 80 through MUX 66, transceiver 64 and transceiver 92. An effective left shift is accomplished by Shift/Mask 80 and the four bits of result sign data stored in DSGN1 106 are merged into the result. The BCD_CC_LS is set by placing the appropriate condition code on interface signals AU CC<0:1> at condition code block 122. XP 182 sets the AU_XP interface signal line if the SSOV signal is true indicating an overflow condition as a result of the addition; that is, if the result requires more storage than provided in the number of bytes allocated for operand 1. In this case only five bytes of the result are stored in the cache in order to prevent destruction of adjacent data while the exception is indicated to the CP 12. In that the result is to be written back into the operand 1 location within the cache memory a RFS is executed. FIG. 6c illustrates the contents of ARB 38 and the left aligned SRC 84.

After synchronization with CP 12 is achieved the content of SRC 84, the left aligned result of the addition of operand 1 and operand 2 with the result sign, is driven onto the CDB 110. In addition, CBYTE__. LE<2,3,4,5,6> are asserted for strobing the result data back into only those cache bytes which are occupied by operand 1. The Cp 12 can test the AU_XP signal and, depending on the state of PCW<51>, may not dispatch if AU_XP is asserted. A further RFS is issued and, if no exceptions exist, the AU 10 dispatches.

One aspect of the invention is that rapid synchronization of the AU 10 and CP 12 is provided for. To gain an appreciation of this aspect of the invention it should be noted that CP 12 instruction execution generally falls into one of four categories.

A first category relates to instructions that require no AU 10 involvement, such as integer addition. The status of the AU 10, as reflected by interface signal lines AU_BUSY* and AU_EOC, have no effect on the CP 12 dispatch nor does the AU 10 itself dispatch on such instructions.

A second category relates to instructions that require the AU 10 to finish a previous AU instruction before the CP 12 may start execution of a next instruction but do not require the AU 10 for actual execution of the next instruction.

A third category relates to instructions that employ serial CP/AU execution and dispatch. These instructions can employ simultaneous dispatch to the next op code. These types of instructions use both the AU 10 and the CP 12 together for execution. They can dispatch simultaneously or the AU 10 may determine an exception condition and dispatch prior to the CP 12. For example, the CP 12 determines if a program interrupt is required based on the state of PCW<50:51>. The AU 10, for certain instructions, can dispatch before the CP 12 even when no exception conditions exist.

A fourth category relates to instructions that allow for parallel execution and independent terminating dispatch, such as all Floating Point instructions which do not require a read or write of the cache memory during the final microinstruction cycle, such as load and store floating point instructions.

The fastest method for the CP 12 to begin the next instruction is to force an RFS (even if none was coded) which will take effect at the end of the next AUDISP cycle. This method is employed when IRO 206 contains an AUINST and also when IRO 206 contains an ILOCK type of instruction and the AU 10 is BUSY.

A second method is employed when a RFS is coded in the CPDISP cycle and the AU 10 indicates that it will be BUSY in its next cycle. For example, such a condition is shown in FIG. 7c. This condition implies that a data transfer is taking place and that the AU 10 has further execution cycles remaining before it can accept and dispatch another instruction. Therefore, and as has been previously described, the fastest method to dispatch the CP 12 to the next instruction is to complete the current cycle as a normal data transfer and then transfer the CP 12 to a dispatch exception (DSPX) microinstruction location to wait for the AU 10. At the DSPX location, the CP 12 normally has coded a RFS, an Inhibit further DSPX, and CPDISP.

When the AU 10 is ahead of the CP 12 the AU 10 may be in a dispatch cycle waiting for a CP 12 RFS to allow the AU 10 to dispatch from IRO. There are four general categories of conditions which determine whether the CP 12 will RFS during a CPDISP thereby allowing the AU 10 to dispatch simultaneously.

A first condition is independent of the state of AU_BUSY* and exists when a next CPDISP is to an AU 10 executed instruction (IRO=AUINST). The CP 12 RFS Generation logic 226 generates CPRFS and as a result an AUDISP occurs.

A second condition exits when a next CPDISP is to a non-AU executed interlock-type instruction and the AU 10 is BUSY. Since the AU 10 is BUSY the CP RFS Generation logic 226 forces CPRFS which causes the CP 12 to wait until the AU 10 completes a prior Floating Point instruction. The AU 10 dispatches after completing the floating point instruction causing an AU 10 RFS and subsequently an AU_EOC. This permits the CPCLK to start and the CP 12 to begin execution of the ILOCK instruction. Since there is no execution required of the AU 10 for these instruction types the AU dispatch target has a coded RFS and AUDISP which in turn causes an AU not-BUSY indication which will remain in effect until the CP 12 encounters a next AUINST.

A third condition exists when a next CPDISP is to a non-AU executed interlock instruction and the AU 10 is not BUSY. For this condition no CP 12 RFS is forced; instead the CP 12 dispatches to the instruction and proceeds. The AU 10 remains in a cycle with AUCLK low, RFS asserted, AUDISP asserted, and AU not-BUSY.

A fourth condition, also independent of the state of AUBUSY*, exists when a next CPDISP is to a non-AU executed, non-interlock instruction. No CP 12 RFS is forced. The CP 12 dispatches to the instruction and proceeds while the AU 10, if BUSY, continues with independent execution.

The CP 12 command, AUI, forces the next occurring AUDISP to select CDB(24:31) as the dispatch target rather than IRO. AUI is applied to the AU 10 via the AUI interface signal line and controls the state of a AUDISP multiplexer 184 (FIG. 2c). The execution of the AUI command causes a coded CPRFS. All AU 10 internal state registers loaded during AUDISP are also loaded during AUI. For example, when AUI is asserted the Floating Point Address registers R1 36 and R2 38 are loaded, as is normal, from IRO(08:15). The assertion of the AUI signal is useful for causing the AU 10 to execute certain instructions, such as the aforementioned math assists, by allowing access to a range of Control Store RAM 26 addresses which are not accessible to those instruction types received from IRO.

The CP 12 command, AUABORT, forces an in-progress AU RFS to inhibit the loading of all AU 10 user-visible registers (R1 36, ER1 142, AU_CC 122, AU-XP 182) and forces the AU 10 to dispatch to a predetermined microinstruction location. AUABORT is applied to the AU 10 interface logic block 186 via the AUABORT interface signal line.

The interface signal line AU Exception Pending (AU_XP) is provided for indicating exception conditions, such as decimal overflow, which result from AU 10 execution. This signal line may be used by the CP 12 in one of two methods, namely as a CP test condition or to cause a trap after CP dispatch.

The trap method is applicable to an exception condition which is encountered during parallel execution of the AU 10 and the CP 12 and involves any successful CPDISP when AU_XP is HIGH, or asserted. This condition indicates that a program interrupt has been determined during parallel Floating Point execution. The CP 12 dispatches normally and traps on the first CPCLK cycle after dispatch. At the XP TRAP location, the CP 12 may have coded an AUI to receive the AU_XP report code, to clear AU_XP, and to force the AU 10 to become idle. Because AU-XP is asserted, the AU 10 dispatches to a predetermined microinstruction exception location where there is coded an AUDISP which causes the AU 10 to wait for the AUI generated by CP 12. All CPDISP which occur with AU_XP asserted indicate a program interrupt condition. In general, this method allows for the reporting of exception conditions occurring during parallel, asynchronous instructions as soon a next CP 12 instruction is started after the exception is determined.

The test method is applicable to an exception condition which occurs during serial execution of the AU 10 and CP 12 and relates to instructions employing simultaneous dispatch AU_XP may be employed as a conditional CPDISP test condition, i.e., the CP 12 will dispatch if AU_XP is not asserted otherwise the CP 12 will continue if AU_XP is asserted. The CP 12 code on the FALSE path can employ an AUI in order to clear AU_XP. Also, the CP 12 can employ this path to test for interrupt handling as specified by a user in the CP 12 PCW 230, specifically PCW(50:51).

Another interface signal of the CP/AU bus 14 is the CP Dispatch Taken (CPDISPTKN) which is employed, when asserted, to indicate to the AU 10 that the CP 12 has dispatched to the next instruction. CPDISPTKN further indicates, when not asserted and the AU 10 is prepared to dispatch, that the CP 12 is not able to successfully proceed with the current dispatch. As an example, such a condition may arise when the CP 12 determines, just prior to dispatch, that the instruction queue does not contain a complete instruction. This may be due to an instruction, which can be from one to four half-words in length, which crosses a virtual memory page. If this condition occurs the CP 12 must suspend instruction prefetch and issue a cache fetch to determine if the next page is resident in the cache memory. In any event, the instruction queue may become partially depleted resulting in the CP 12 deasserting CPDISPTKN in order to disable the AU 10 dispatch. This condition exists for one AU CLK period and forces the AU 10 to an IDLE microinstruction location and maintains all AU 10 user visible registers. In that the machine state is preserved the effect is that the AU 10 dispatch is temporarily postponed. It should be noted that, when the AU 10 takes a dispatch without the CP 12 taking a dispatch and without an AUI, a CP-not-ready cycle follows within the AU.

Other CP/AU bus 14 signals include the UNIT_CLK signal and the signals DCDATA and DCCID which relate to the SCUI 180. DCDATA is a bidirectional serial data line which conveys all data and ID information between the System Console Unit and each bus connection. DCCID is a signal line which qualifies DCDATA as either conveying data or the ID of a specific bus connection. In addition, DCCID is operable for resetting the SCUI 180, if held low for a predetermined number of cycles, while the rising edge synchronizes the various SCUI devices.

In addition, a system power fail signal (PWRF) and a system reset signal (SYSRST) are provided and which operate in a conventional manner. PHSIN is employed to define the identical phase of all clocks generated by the SCUI 180. PHASE_OUT synchronizes all CP_CLKs, AU_CLKs and System Bus Clocks.

Also eight cache data bus parity signals (CDB_PRTY<0..7>) are provided, one parity signal for each byte of the CDB 110. The AU 10 checks CDB 110 parity during cache reads and generates cache parity during cache data write operations.

As was previously stated, the foregoing description has been made in the context of a CP/AU coprocessor combination but it should be realized that the teaching of the invention is applicable to the synchronization of coprocessors in general. Thus, the invention may be practiced in ways and by means other than those specifically disclosed above and, as such, the invention is not to be construed to be limited only to the present preferred embodiment. The invention is instead intended to be limited only as it is set forth in the claims which follow.

What is claimed is:

1. An information processing system including a first data processing means and a second data processing means each of which includes means for independently executing macroinstructions during one or more microinstruction cycles having a period that is a multiple of a period of a repetitive unit clock signal, each of the data processing means including means, having an input coupled to the unit clock signal and an input coupled to a request for sychronization signal generated by the other data processing means, for generating an associated microinstruction cycle clock signal having a period that is a multiple of the period of the unit clock signal, the microinstruction cycle clock signal generating means further comprising means, responsive to an assertion of the request for synchrozintation signal, for suspending the generation of the microinstruction cycle clock signal and for beginning a next microinstruction cycle clock signal, in synchronism with the other data processing means beginning a next microinstruction clock signal, upon a transition of the unit clock signal.

2. An information processing system as set forth in claim 1 wherein both the first data processing means and the second data processing means each comprise means for generating at least one output signal for indicating that the associated data processing means is executing a final microinstruction of a macroinstruction, the output signal of each of the data processing means being coupled to an input of the generating means of the other data processing means.

3. An information processing system as set forth in claim 1 and further comprising memory means addressed by the first data processing means, the memory means having a bidirectional data bus coupled at least to the second data processing means.

4. An information processing system as set forth in claim 1 and further comprising a memory means addressed by the first data processing means, the memory means having a bidirectional data bus coupled at least to both the first and second processing means, the first data processing means further comprising an instruction register means for storing a macroinstruction read from the memory means, the instruction register means having an output coupled to the second data processing means.

5. An information processing system as set forth in claim 4 wherein the first data processing means comprises instruction decoding means coupled to the output of the instruction register means for detecting macroinstructions which are executed by the second data processing means.

6. An information processing system as set forth in claim 5 wherein the detected macroinstructions include macroinstructions which operate on operands stored at address locations within the memory means, and wherein the first data processing means further includes at least one address output signal which is coupled to and received by the second data processing means, the at least one address output signal indicating a portion of the address location within the memory means of an operand associated with one of the detected macroinstructions.

7. An information processing system as set forth in claim 6 wherein the at least one address output signal further indicates a location, relative to an address, of the operand within the memory means.

8. An information processing system as set forth in claim 7 wherein, for a first type of macroinstruction, the instruction register means output includes a first plurality of signals for indicating, in conjunction with the at least one address output signal, a number of memory means storage locations occupied by an operand that is referenced by the first type of macroinstruction.

9. An information processing system as set forth in claim 8 wherein the second data processing means further comprises determining means responsive to the at least one address output signal, and also to the first plurality of instruction register means output signals, for determining a number of memory means access cycles required to completely read the operand from the memory means.

10. An information processing system as set forth in claim 9 wherein the second data processing means further comprises a plurality of output signals which are driven by the determining means and which are coupled to the first data processing means for indicating to the first data processing means the determined number of memory means access cycles.

11. An information processing system as set forth in claim 7 wherein the second data processing means further comprises means, having an input coupled coupled to the at least one address signal, for asserting a plurality of memory means write enable output signals which are coupled to the memory means for enabling only those locations within the memory means which are occupied by the operand, predetermined ones of the plurality of memory means write enable signals being asserted by the second data processing means to store a result of a macroinstruction which operates on the operand, the result being stored within the memory means at the storage locations occupied by the operand.

12. An information processing system as set forth in claim 11 wherein the second data processing means further includes means, responsive to the operation of the asserting means, for providing an output signal which is coupled to the first data processing means for informing the first data processing means of an exception condition, including a condition wherein a result of the execution of a macroinstruction requires more memory means storage locations than are occupied by the first operand.

13. An information processing system as set forth in claim 5 wherein the second data processing means includes a plurality of floating point register means and wherein the instruction register means output includes a first plurality of signals for identifying one of the floating point register means to be loaded with a first operand associated with a detected macroinstruction, and wherein the instruction register output further includes a second plurality of signals for identifying another one of the floating point register means associated with a second operand.

14. An information processing system as set forth in claim 5 wherein the instruction decoding means further detects other macroinstructions which are executed by the first data processing means and which require, before execution, the termination of execution of a macroinstruction by the second data processing means.

15. An information processing system as set forth in claim 14 wherein the second data processing means further includes means for indicating the termination of execution of a macroinstruction and wherein the generating means further comprises means, coupled to and responsive to the operation of the instruction termination indicating means, for enabling the execution of one of the other macroinstructions after the second data processing means terminates execution of a macroinstruction.

16. An information processing system as set forth in claim 15 wherein the other macroinstructions include conditional branch instructions, and wherein the second data processing means further includes a plurality of condition code output signals which are coupled to the first data processing means for informing the first data processing means of condition generated by the execution of a macroinstruction.

17. An information processing system comprising:
memory means;
first data processing means comprising means for addressing the memory means wherein instructions and operands related to instructions are stored;
second data processing means comprising means for executing a first plurality of the instructions, the second data processing means being coupled to the memory means for reading therefrom operands associated with certain ones of the first plurality of instructions and for storing within the memory means a result of the certain instructions which operate on the operands;
the system further comprising an interface means coupled between the first and the second data processing means, the interface means including a plurality of signals coupled to both the first and the second data processing means, the plurality of signals comprising:
a repetitive unit clock signal having a substantially constant period associated therewith, the unit clock signal being received by both the first and the second data processing means;
an instruction signal generated by the first data processing means and received by the second data processing means, the instruction signal being expressive of at least which one of the predetermined instructions is to be executed by the second data processing means;
a first end of cycle signal asserted by the first data processing means and received by the second data processing means, the first end of cycle signal indicating, when asserted, that the first data processing means can be synchronized with the second data processing means;

a second end of cycle signal asserted by the second data processing means and received by the first data processing means, the second end of cycle signal indicating, when asserted, that the second data processing means can be synchronized with the first data processing means; and wherein each of the first and the second data processing means further comprise:

means for generating an instruction clock signal having a period which is a function of a multiple of the period of the unit clock signal;

means for generating a request for synchronizing the beginning of the associated instruction clock signal to the beginning of the instruction clock signal of the other data processing means; and means, responsive to the assertion of the first and the second end of cycle signals and also to the operation of the request generating means, for simultaneously synchronizing the beginning of the associated instruction clock signal with a transition of the unit clock signal.

18. An information processing system as set forth in claim 17 wherein the interface means further includes a bidirectional data bus coupled at least to both the first and the second processing means and to the memory means, the first data processing means further comprising an instruction register means for storing an instruction read from the memory means, the instruction register means having an output coupled to the second data processing means by the instruction signal.

19. An information processing system as set forth in claim 18 wherein the first data processing means comprises instruction decoding means coupled to the output of the instruction register means for decoding predetermined instructions to be executed by the second data processing means, including instructions which operate on operands stored at address locations within the memory means, and wherein the interface means further includes a plurality of address output signals which are coupled from the first data processing means to the second data processing means, the address output signals indicating a byte alignment of an operand within the memory means.

20. An information processing system as set forth in claim 19 wherein, for a first type of predetermined instruction, the instruction signal includes a first plurality of operand length signals for indicating a number of memory means storage locations occupied by a first operand associated with the first type of predetermined instruction, and wherein the instruction signals further includes a second plurality of operand length signals for indicating a number of memory means storage locations occupied by a second operand associated with the first type of predetermined instruction.

21. An information processing system as set forth in claim 20 wherein the second data processing means further comprises means responsive to the address output signals and also to the first and the second plurality of operand length signals, for determining a number of memory means access cycles required to access each of the first and the second operands within the memory means, and wherein the interface means further comprises a plurality of signals which are driven by the determining means and which are coupled to the first data processing means for indicating to the first data processing means the determined number of access cycles.

22. An information processing system as set forth in claim 20 wherein the second data processing means includes a plurality of floating point registers and wherein, for a second type of predetermined instruction, the instruction signal includes a first plurality of signals for indicating a specific one of the floating point registers to be loaded with a first operand associated with the second type of predetermined instruction, and wherein the instruction signal further includes a second plurality of signals for indicating another specific one of the floating point registers associated with the second type of instruction.

23. An information processing system as set forth in claim 22 wherein the interface means further includes means, responsive to the operation of the executing means of the second data processing means, for generating a plurality of condition code output signals which are coupled to the first data processing means for informing the first data processing means of conditions generated by the execution of one of the first or the second type of predetermined instructions.

24. An information processing system comprising memory means for storing instructions and operands and having a data bus coupled to a first processing means and to a second processing means, the first and the second processing means being coupled together by an interface means having a plurality of signals, the first processing means comprising means for generating a memory means address and means for generating memory means access cycles for at least reading instructions and operands from the memory means, the first processing means further comprising:

means for identifying and providing on the interface means predetermined ones of the instructions to the second processing means for execution therein;

means for providing on the interface means a first signal to the second processing means, the first signal indicating a location, relative to an address within the memory means, of an operand associated with a provided instruction, wherein the memory means is comprised of a plurality of bytes; and means for providing on the interface means a second signal to the second processing means, the second signal being expressive of a number of bytes occupied by the operand;

the second processing means comprising:

means for determining from the first signal and from the second signal a number of memory means access cycles which are required to at least read the operand, the means for determining comprising an output for providing on the interface means a third signal to the first processing means, the third signal being coupled to the memory means access cycles generating means for controlling the operation thereof.

25. An information processing system as set forth in claim 24 wherein the interface means further includes a unit clock signal coupled in common to both the first and the second processing means, wherein both the first and the second processing means comprise means for generating an instruction clock signal having a period which is a multiple of the unit clock signal, and wherein both the first and the second processing means further comprise means for synchronizing the beginning of the associated instruction clock signal with a transition of the unit clock signal such that at least the operation of the determining means is synchronized with the operation of the memory means access cycles generating means.

26. An information processing system as set forth in claim 25 wherein said second processing means further comprises means, coupled to and responsive to the operation of the determining means, for providing a plurality of memory means byte load enable signals to the interface means for selectively activating predetermined bytes of said memory means for storing a result of an instruction therein.

27. An information processing system as set forth in claim 25 wherein said second processing means further comprises first means for generating condition codes relating to the execution of instructions therein, said condition code generating means having at least one output coupled to said first processing means, and wherein said first processing means further comprises second means for generating condition codes relating to the execution of instructions therein, said first processing means further comprising means for selecting condition codes for examination that are generated by either said first means or generated by said second means.

28. An information processing system as set forth in claim 27 wherein said instruction identifying means further identifies interlock-type instructions executed by said first processing means which require said second processing means to complete the execution of an instruction before said first processing means executes the interlock-type instruction.

29. An information processing system as set forth in claim 24 wherein said second processing means further comprises means for determining the occurrence of an exception processing condition related to the execution of instructions therein, said exception processing determining means having an output coupled to said first processing means by said interface means for informing said first processing means of the occurrence of an exception processing condition.

30. An information processing system as set forth in claim 24 wherein said first processing means further comprises means for indicating a type of further processing to be performed upon the occurrence of an exception processing condition, said means for indicating having at least one output coupled to said second processing means by said interface means.

31. An information processing system as set forth in claim 24 wherein said second processing means further comprises microinstruction memory means having a plurality of addressable locations for storing microinstructions executed by said second processing means, and wherein said first processing means further comprises means for providing on the interface means a signal for selecting a range of addresses within the microinstruction memory means from which the second processing means executes the microinstructions.

32. An information processing system as set forth in claim 24 wherein said first processing means further comprises means for indicating to said second processing means that said first processing means has begun execution of an instruction.

33. An information processing system as set forth in claim 24 wherein said first processing means further comprises means for indicating to said second processing means that said second processing means is to abort an execution of a current instruction so as to cause the second processing means to become idle and also become ready to execute a further instruction while preserving a program state of the second processing means.

34. Data processing apparatus comprising:
memory access control means coupled to a memory means for fetching instructions therefrom, including instructions which operate on operands stored at locations within the memory means;
instruction decoding means for identifying at least a first type of instructions which are executed by the data processing apparatus and for identifying at least a second type of instructions which are executed by a second data processing apparatus;
means for providing the second type of instructions to the second data processing apparatus;
data bus means for providing operands associated with the second type of instructions to the second data processing apparatus;
means for providing to the second data processing apparatus information specifying a number of locations within the memory means which are occupied by at least one operand associated with the provided instruction;
means for providing to the second data processing apparatus information expressive of a location, relative to an address within the memory means, of the at least one operand; and
means, coupled to and responsive to the operation of the second data processing means, and also coupled to a reference clock signal, for synchronizing, with a transition of the reference clock signal, a generation of instruction cycle clocks.

35. Data processing apparatus as set forth in claim 34 wherein the first type of instructions include conditional branch instructions and wherein the data processing apparatus further comprises means for selecting for examination either condition codes generated by the data processing apparatus or condition codes generated by the second data processing apparatus.

36. Data processing apparatus as set forth in claim 35 wherein the synchronizing means is responsive to the operation of the decoding means decoding a conditional branch instruction for suspending the generation of instruction cycle clocks until the second data processing apparatus indicates that it has generated condition codes as a result of the execution of one of the second type of instructions.

37. Data processing apparatus as set forth in claim 34 and further comprising means for indicating a type of exception processing to be performed upon the occurrence of an exception condition, the indicating means having an output coupled to the second data processing apparatus.

38. Data processing apparatus as set forth in claim 37 and further comprising means responsive to the operation of the second data processing apparatus for initiating, during the execution of one of the second type of instructions, exception processing.

39. Data processing apparatus as set forth in claim 37 and further comprising means responsive to the operation of the second data processing apparatus for initiating, subsequent to the execution of one of the second type of instructions, exception processing.

40. Data processing apparatus as set forth in claim 34 wherein the memory access control means is coupled to and responsive to the operation of the second data processing apparatus for performing a number of memory access cycles which are specified by the second data processing apparatus in order to completely read an operand from the memory means or to completely store a result of an operation within the memory means.

41. Data processing apparatus as set forth in claim 40 wherein the memory access control means is further coupled to and responsive to the operation of the second data processing apparatus for selectively activating only predetermined bytes of the memory means for storing therein a result of an execution of one of the second type of instructions.

42. Data processing apparatus as set forth in claim 34 wherein the second type of instructions include instructions having word aligned operands and wherein the memory access control means includes means for determining, prior to the operand being provided on the data bus means, that an operand is not double word aligned; means for reading two consecutive double words each having one word of the operand; and means for double word aligning the operand.

43. Data processing apparatus coupled during use to memory means, comprising:
  means for executing instruction stored within the memory means, including floating point and decimal arithmetic instructions, the instructions operating on one or more operands, also stored within the memory means, to produce a result;
  data bus means, coupled to the memory means, for receiving the operands therefrom and for providing results thereto;
  first receiving means, for coupling to other data processing apparatus, for receiving an instruction therefrom;
  second receiving means, for coupling to other data processing apparatus, for receiving information that specifies a number of memory means storage locations which are occupied by at least one operand associated with the instruction;
  third receiving means, for coupling to other data processing apparatus, for receiving information expressive of a location, relative to an address within the memory means, of the at least on operand; and
  means, coupled to the second and to the third receiving means, for determining a number of memory means access cycles required to completely read the at least one operand from the memory means.

44. Data processing apparatus as set forth in claim 43 and further comprising means, coupled to and responsive to the operation of the determining means, for providing a plurality of memory means byte load enable signals for selectively activating predetermined bytes of the memory means for storing the result of an instruction therein.

45. Data processing apparatus as set forth in claim 43 and further comprising means for determining the occurrence of an exception processing condition related to the execution of instructions therein, the exception processing determining means having an output for indicating the occurrence of an exception processing condition.

46. Data processing apparatus as set forth in claim 43 and further comprising microinstruction memory means having a plurality of addressable locations for storing microinstructions executed by the data processing apparatus, the data processing apparatus further comprising an input for receiving an input signal for selecting a range of addresses within the microinstruction memory means from which the data processing apparatus executes the microinstructions.

47. Data processing apparatus as set forth in claim 43 and further comprising means for generating condition codes relating to the execution of instructions therein, the data processing apparatus further comprising at least one output for outputting the generated condition codes.

48. Data processing apparatus as set forth in claim 43 and further comprising means, coupled to other data processing apparatus, for receiving a request for synchronization therefrom, and also coupled to a reference clock signal, for synchronizing, with a transition of the reference clock signal, a generation of microinstruction cycle clocks.

* * * * *